United States Patent
Ji et al.

(10) Patent No.: US 10,305,648 B2
(45) Date of Patent: May 28, 2019

(54) METHOD AND APPARATUS FOR TRANSMITTING AND RECEIVING BACKHAUL SUBFRAME CHANNEL IN WIRELESS COMMUNICATION SYSTEM

(75) Inventors: Hyoung Ju Ji, Seoul (KR); Joon Young Cho, Suwon-si (KR); Ju Ho Lee, Suwon-si (KR); In Ho Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 666 days.

(21) Appl. No.: 13/319,198

(22) PCT Filed: May 4, 2010

(86) PCT No.: PCT/KR2010/002832
§ 371 (c)(1),
(2), (4) Date: Nov. 7, 2011

(87) PCT Pub. No.: WO2010/128790
PCT Pub. Date: Nov. 11, 2010

(65) Prior Publication Data
US 2012/0057523 A1 Mar. 8, 2012

(30) Foreign Application Priority Data

May 6, 2009 (KR) .................. 10-2009-0039334
Jun. 11, 2009 (KR) .................. 10-2009-0051840

(51) Int. Cl.
*H04L 5/00* (2006.01)
*H04W 84/00* (2009.01)
*H04B 7/155* (2006.01)

(52) U.S. Cl.
CPC .......... *H04L 5/0032* (2013.01); *H04B 7/155* (2013.01); *H04L 5/0044* (2013.01);
(Continued)

(58) Field of Classification Search
CPC ... H04L 5/0053; H04L 5/0007; H04L 5/0023; H04L 1/1812; H04L 5/0048;
(Continued)

(56) References Cited

U.S. PATENT DOCUMENTS 6,757,270 B1    6/2004  Kumar et al.
2008/0219229 A1*  9/2008  Zheng ............... H04B 7/15557
                                                  370/338

(Continued)

FOREIGN PATENT DOCUMENTS

WO    2007/112143 A2    10/2007

OTHER PUBLICATIONS

Samsung, Discussion on Backhaul Control Design for Type-I L3 Relay, 3GPP TSG RAN WG1 Meeting #57, R1-091871, May 4-8, 2009, San Francisco, USA.
(Continued)

*Primary Examiner* — Asad M Nawaz
*Assistant Examiner* — Najeeb Ansari
(74) *Attorney, Agent, or Firm* — Jefferson IP Law, LLP

(57) ABSTRACT

The present invention relates to a method for transmitting a backhaul sub frame channel of a base station in a wireless communication system. The method for transmitting a backhaul sub frame channel according to one embodiment of the present invention comprises: creating a downlink relay control channel by coding downlink relay control information that is transmitted to a relay; allocating the created downlink relay control channel to a first slot of a semi-static resource region that is allocated to the relay; and transmitting, to the relay, a backhaul sub frame to which the channel is allocated. Compared to existing control channel transmission techniques, the present invention can minimize overheads. Moreover, the present invention also reduces control (Continued)

channel resources required during retransmission and for the transmission of multiple backhaul subframes.

4 Claims, 19 Drawing Sheets

(52) U.S. Cl.
CPC .......... *H04L 5/0053* (2013.01); *H04W 84/00* (2013.01); *H04L 5/0007* (2013.01)

(58) Field of Classification Search
CPC ..... H04L 5/0094; H04L 5/001; H04L 1/1861; H04L 5/0041; H04L 5/0044; H04L 5/0092; H04L 1/1893; H04L 5/0026
USPC .................................................. 370/315, 329
See application file for complete search history.

(56) References Cited

U.S. PATENT DOCUMENTS

| | | | |
|---|---|---|---|
| 2008/0233967 A1 | 9/2008 | Montojo et al. | |
| 2009/0181615 A1* | 7/2009 | So ..................... | H04B 7/15521 455/7 |
| 2009/0252079 A1* | 10/2009 | Zhang .................... | H04B 7/155 370/315 |
| 2010/0034135 A1* | 2/2010 | Kim et al. ................... | 370/315 |
| 2010/0085901 A1* | 4/2010 | Womack .............. | H04B 7/2656 370/278 |
| 2010/0195599 A1* | 8/2010 | Zhang ................... | H04L 5/0094 370/329 |
| 2010/0220645 A1* | 9/2010 | Kwon ................. | H04B 7/2606 370/315 |
| 2010/0232346 A1* | 9/2010 | Yu et al. ........................ | 370/315 |
| 2010/0238845 A1* | 9/2010 | Love et al. .................... | 370/280 |
| 2010/0272006 A1* | 10/2010 | Bertrand .............. | H04B 7/2606 370/315 |
| 2011/0085457 A1* | 4/2011 | Chen .................... | H04L 1/1812 370/252 |
| 2011/0096734 A1* | 4/2011 | Damnjanovic ........ | H04L 5/0053 370/329 |
| 2011/0110263 A1* | 5/2011 | Yi .......................... | H04L 1/1642 370/252 |
| 2011/0110310 A1* | 5/2011 | Cai ..................... | H04B 7/15542 370/328 |
| 2011/0122846 A1* | 5/2011 | Yu ...................... | H03M 13/2903 370/335 |
| 2011/0128893 A1* | 6/2011 | Park et al. ..................... | 370/279 |
| 2011/0141952 A1* | 6/2011 | Wang ................... | H04L 1/1812 370/294 |
| 2011/0194412 A1* | 8/2011 | Park et al. ..................... | 370/241 |
| 2011/0211522 A1* | 9/2011 | Chung et al. ................. | 370/315 |
| 2011/0222428 A1* | 9/2011 | Charbit ............. | H04B 7/15557 370/252 |
| 2011/0250897 A1* | 10/2011 | Seo et al. ....................... | 455/445 |
| 2011/0280193 A1* | 11/2011 | Lindh .................. | H04L 1/1874 370/329 |
| 2011/0317610 A1* | 12/2011 | Park et al. ..................... | 370/312 |
| 2011/0317614 A1* | 12/2011 | Park et al. ..................... | 370/315 |
| 2011/0317641 A1* | 12/2011 | Noh et al. ..................... | 370/329 |
| 2012/0002593 A1* | 1/2012 | Kim et al. ..................... | 370/315 |
| 2012/0033588 A1* | 2/2012 | Chung et al. ................. | 370/280 |
| 2012/0039239 A1* | 2/2012 | Park et al. ..................... | 370/315 |
| 2012/0113884 A1* | 5/2012 | Park et al. ..................... | 370/312 |
| 2013/0022004 A1* | 1/2013 | Chen et al. .................... | 370/329 |

OTHER PUBLICATIONS

Nortel, Control Channel and Data Channel Design for Relay Link in LTE-Advanced, 3GPP TSG-RAN Working Group 1 Meeting #56, R1-090753, Feb. 9-13, 2009, Athens, Greece.

Catt, Design of Backhaul Control Channel for Type 1 Relay in LTE-A, 3GPP TSG RAN WG1 #57, R1-091990, May 4-9, 2009, San Francisco, USA.

LG Electronics; Resource Allocation and Downlink Control Channel Structure for Relay Backhaul Link; 3GPP TSG RAN WG1 Meeting #57; R1-092115; May 4-8, 2009; San Francisco, CA.

* cited by examiner

METHOD AND APPARATUS FOR TRANSMITTING AND RECEIVING BACKHAUL SUBFRAME CHANNEL IN WIRELESS COMMUNICATION SYSTEM

BACKGROUND OF THE INVENTION

1. Field of the Invention

The present invention relates to a mobile communication system and, in particular to a method and apparatus for transmitting and receiving wireless backhaul subframe in a wireless communication system based on Orthogonal Frequency Division Multiplexing (OFDM).

2. Description of the Related Art

OFDM is a multicarrier modulation scheme for transmitting data through multiple subcarriers in parallel. In an OFDM system, an input symbol stream is divided into several sub-symbol streams and modulated into multiple orthogonal subcarriers for transmission.

The origins of OFDM started in the late 1950's with the Frequency Division Multiplexing for military communication purpose, OFDM using orthogonal overlapping multiple subcarriers has been developed in 1970's but limited in wide spread used due to the difficult of implementing orthogonal modulations between multiple carriers. With the introduction of the idea of using a Discrete Fourier Transform (DFT) for implementation of the generation and reception of OFDM signals, by Weinstein, in 1971, the OFDM technology has developed rapidly. Additionally, the introduction of a guard interval at the start of each symbol and use of cyclic prefix (CP) overcomes the negative effects caused by multipath signals and delay spread.

Owing to such technical advances, the OFDM technology is applied in various digital communications fields such as Digital Audio Broadcasting (DAB), Digital Video Broadcasting (DVB), Wireless Local Area Network (WLAN), and Wireless Asynchronous Transfer Mode (WATM). That is, the implementation of OFDM could be accomplished by reducing implementation complexity with the introduction of various digital signal processing technologies such as Fast Fourier Transform (FFT) and Inverse Fast Fourier Transform (IFFT).

OFDM is similar to Frequency Division Multiplexing (FDM) but much more spectrally efficient for achieving high speed data transmission by overlapping multiple subcarriers orthogonally. Due to the spectral efficiency and robustness to the multipath fading, OFDM has been considered as a prominent solution for broadband data communication systems.

Other advantages of OFDM are to control the Inter-symbol Interference (ISI) using the guard interval and reduce the complexity of equalizer in view of hardware as well as spectral efficiency and robustness to the frequency selective fading and multipath fading. OFDM is also robust to the impulse noise so as to be employed in various communication systems.

In wireless communications, high-speed, high-quality data services are generally hindered by the channel environments. In wireless communications, the channel environments suffer from frequent changes not only due to additive white Gaussian noise (AWGN) but also power variation of received signals, caused by a fading phenomenon, shadowing, a Doppler effect brought by movement of a terminal and a frequent change in a velocity of the terminal, interference by other users or multipath signals, etc. Therefore, in order to support high-speed, high-quality data services in wireless communication, there is a need to efficiently overcome the above channel quality degradation factors.

In OFDM, modulation signals are located in the two-dimensional time-frequency resources. Resources on the time domain are divided into different OFDM symbols, and are orthogonal with each other. Resources on the frequency domain are divided into different tones, and are also orthogonal with each other. That is, the OFDM scheme defines one minimum unit resource by designating a particular OFDM symbol on the time domain and a particular tone on the frequency domain, and the unit resource is called a Resource Element (RE). Since different REs are orthogonal with each other, signals transmitted on different REs can be received without causing interference to each other.

Physical channel is a channel defined on the physical layer for transmitting modulation symbols obtained by modulating one or more coded bit sequences. In an Orthogonal Frequency Division Multiple Access (OFDMA) system, a plurality of physical channel can be transmitted depending on the usage of the information sequence or receiver. The transmitter and receiver negotiate the RE on which a physical channel is transmitted, and this process is called mapping.

The LTE system is one of the representative system adopting the above-described OFDM in downlink while using Single Carrier-Frequency Division Multiple Access (SC-FDMA) in uplink.

FIG. 1 is a diagram illustrating a configuration of subframe for use in LTE (Long Term Evolution) system to which the present invention is applied.

Referring to FIG. 1, a given LTE transmission bandwidth 107 is segmented into a plurality of Resource Blocks (RBs), and each of RBs 109 and 113 is generated from 12 subcarriers in frequency domain and 14 OFDM symbols 113 or 12 OFDM symbols 121 in time domain and is a basic unit of resource allocation. A subframe 105 is has a length of 1 ms and consists of 2 slots 103.

The reference signal (RS) 119 is the signal agreed for use in channel estimation between a User Equipment (UE) and an evolved Node B (eNB) and transmitted through a corresponding antenna ports 0, 1, 2, and 3. Although the absolute positions of REs designated for RS in the frequency domain are configured differently depending on the cell, the relative interval between the RSs is maintained. That is, the RSs for the same antenna port are transmitted while spaced as many as 6 REs. The reason why the absolute positions of the RSs vary is to avoid collision between RSs in different cells.

Meanwhile, the control channel signal is transmitted at the beginning of the subframe in time domain. In FIG. 1, reference number 117 indicates the region in which the control channel signal is transmitted. The control channel signal can be transmitted across L OFDM symbols at the beginning of the subframe. L can be 1, 2, or 3. FIG. 1 is depicted to describe the case when L is 3. In case that one OFDM symbol is enough for transmitting the control channel, the first OFDM symbol of the subframe is assigned for the control channel (L=1). In this case, the rest 13 OFDM symbols are used for data transmission. The value L is used as the basic information for demapping at the receiver. Accordingly, if L not received, the UE cannot recover the control channel. In that a subframe is Multimedia Broadcast over a Single Frequency Network (MBSFN), the value of L is fixed to 2, and the LTE UE cannot receive the data region of the corresponding subframe.

The reason why the control channel signal is arranged at the beginning of the subframe is to allow a UE to check the control channel signal in advance to determine whether the data channel signal following the control channel signal is destined itself. That is, the UE determines whether to receive the data channel signal based on the control channel signal. If it is determined that there is no data channel signal destined to the UE, there is no need for the UE to receive the data channel signal and, as a consequence, the UE can save the unnecessary power consumption for receiving the data channel signal.

The LTE standard defines three downlink control channels, i.e. Physical Control Format Indicator Channel (PCFICH), Physical Hybrid ARQ Indicator Channel (PHICH), and Packet Data Control Channel (PDCCH), that are transmitted in unit of Resource Element Group (REG) 111 in the region 117 of FIG. 1.

PCFICH is the physical channel for transmitting the Control Channel Format Indicator (CCFI) to UE. CCFI is 2-bit long and indicates the number of symbols occupying the control region in a subframe "L". Since a terminal can recognize the number of symbols of the control region based on the CCFI, the PCFICH must be the first channel to be received in a subframe except when the downlink resource is allocated persistently. Since UE does not know the value of L before receiving the PCFICH, the PCFICH is always mapped to the first OFDM symbol of each subframe. The PCFICH is transmitted in 4 resource groups formed by equally separating 16 subcarriers in frequency.

PHICH is the physical channel for transmitting downlink ACK/NACKs. PHICH is received by the UE which is performing uplink data transmission. Accordingly, the number of PHICHs is in proportion to the number of UEs performing uplink transmissions. PHICH is transmitted in the first OFDM symbol ($L_{PHICH}=1$) or across three OFDM symbols ($L_{PHICH}=3$) of the control region. The PHICH configuration information (number of channel, $L_{PHICH}$) is broadcast through the Primary Broadcast Channel (PBCH) such that all of the UEs acquire the information at their initial connection to the cell. Also, PHICH is transmitted at predetermined position per cell like the PCFICH such that the UEs can acquire the PHICH configuration information by receiving the PBCH when the UE connects to the cell regardless of other control channel information.

In order to multiplex several ACK/NACK signals, Code Domain Multiplexing (CDM) technique is applied for PHICH. In a single REG, 8 PHICH signals are multiplexed into 4 real number parts and 4 imaginary number parts by means of the CDM technique and repeated as many as $N_{PHICH}$ so as to be distributed in frequency domain to obtain frequency diversity gain. By using $N_{PHICH}$ REG, it is possible to form the 8 or less PHICH signals. In order to form the PHICH signals more than 8, it is necessary to use other $N_{PHICH}$ REG.

After assigning resources for PCFICH and PHICH, the eNB determines the value of L, maps the physical channels to the REG of the assigned control region 117 based on the value of L. Next, the eNB performs interleaving to obtain frequency diversity gain. The interleaving is performed on the total REGs of the subframe determined by the value of L in unit of REG in the control region. The output of the interleaver in the control region is capable of preventing the Inter-Cell Interference (ICI) caused by using the same interleaver for the cells and obtaining the diversity gain by distributing the REGs of the control region across one or more symbols. Also, it is guaranteed that the REGs forming the same control channel are distributed uniformly across the symbols per control channel.

PDCCH 117 is a physical channel for transmitting data channel allocation information or power control information. The PDCCH 117 can be transmitted at different channel coding rates according to the channel condition of the target UE. Since Quadrature Phase Shift Keying (QPSK) is fixedly used for PDCCH transmission, it is required to change the resource mount for transmitting PDCCH 117 in order to change channel coding rate. When the channel condition of the terminal is good, a high channel coding rate is used to save the resource. In contrast, when the channel condition of the terminal is bad, a low channel coding rate is used to increase reception probability at the UE even with the cost of large amount of resource. The resource amount consumed by each PDCCH is determined in unit of Control Channel Element (CCE). Each CCE is composed of plural Resource Element Groups (REGs) 111. In order to secure diversity, the REGs of the PDCCH are arranged in the control region after interleaving has been performed.

Recently, researches are being conducted on LTE-Advanced (LTE-A) evolved from the legacy LTE. In the LTE-A system, the researches are focused on coverage expansion using relays to remove shadow area in the cell and wireless backhaul to establish wireless link between eNB and relay responsible for the same functions of the eNB.

FIG. 2 is a diagram illustrating a relationship between frames transmitted to and received from the relay in the OFDM-based system.

Referring to FIG. 2, the relay 203 receives eNB data from the macro eNB 201 and relays the eNB data to the UE attached to the relay. In the cell having a relay, there exists various types of links as shown in FIG. 2.

In FIG. 2, reference number 209 denotes Link A established between the eNB 201 and UE 207, and the UE 205 receives the data through Link C established with the relay 203. In view of the UE, since the relay is shown as a legacy eNB, Link A 209 and Link C 213 are regarded as identical transmission region as denoted by reference number 219. Reference number 211 denotes Link B established between the eNB and the relay so as to be used for the eNB transmit data to the UE connected to the relay and exchange higher layer signals between the eNB and relay. Reference numbers 215 and 233 denote the subframes carrying the data from the eNB to the relay and from the relay to the UE.

Reference number 215 denotes the configuration of a downlink subframe transmitted by the eNB to the UE or the relay, and reference number 217 denotes the configuration of a downlink subframe transmitted from the relay to the UE or received by the eNB. Reference number 219 denotes the configuration of a subframe transmitted from the eNB to the UE connected to the eNB or from the eNB or relay to the UE connected to the relay. Reference number 221 denotes the subframe carrying the data for backhaul transmission. The backhaul subframe can multiplex the transmission to the UE connected to the eNB depending on the scheduling and can be dedicated to the backhaul data transmission. Reference number 235 denotes the resource region for use in backhaul transmission.

The eNB transmits control channel 225 in all of the subframes, and the relay transmits controls channel in the same manner. However, since the relay cannot perform data reception and transmission simultaneously, it is cannot receive the control channel transmitted by the eNB while transmitting control channel. Meanwhile, the eNB transmits the data destined to the relay in the region 235 after control channel transmission, and the relay has to receive the information on the corresponding region. Since the relay has transmitted in the control channel transmission region, it is necessary to perform transmission/reception switching for receiving the data in the corresponding region in the blank region as denoted by reference number 229. The blank region 229 can be positioned at both ends of a subframe symmetrically or at one of both ends of the subframe asymmetrically.

FIG. 3 is a diagram illustrating configurations of backhaul subframe of the relay in the legacy LTE system.

Referring to FIG. 3, the configuration of backhaul subframe 307 is similar to the configuration for control and data channel transmissions of the legacy LTE system. In the legacy LTE subframe, a few symbols at the beginning of the subframe is used for transmitting control channels (PC-FICH, PHICH, and PDCCH) 301, and the resource allocated for control channels are frequency multiplexed. In case of using this configuration, it is possible to transmit backhaul data for relay in some part of data transmission region. That is, the symbol including the region denoted by reference number 303 is used for relay control channel and the symbol including the region denoted by reference number 305 is used for relay data channel transmission.

This configuration following the legacy LTE subframe structure is advantageous in that additional channel coding and multiplexing scheme are not necessary. However, the region carrying the relay control channel should be assigned in advance as denoted by reference number 307, and scheduling the UEs connected to the eNB can be limited depending on the number of relays or assigned resource amount. In case that the allocated resource is larger than the resource for real transmission to the relay, resource waste becomes significant. The backhaul subframe as denoted by reference number 313 is configured to have a new relay control channel 311 and a relay data channel 311 and, the data amount to the relay is large, assigns additional relay data channel 315, unlike the conventional control channel configuration. This subframe configuration is advantageous in that allocated resource amount is smaller that of the subframe configuration denoted by reference number 307. However, it is a shortcoming that a new relay-dedicated control channel should be implemented.

SUMMARY OF THE INVENTION

Problem to be Solved

The present invention proposes a method and apparatus for backhaul subframe channel transmission and reception method and apparatus that is capable of minimizing scheduling restriction of eNB, improving degree of freedom of system, and allocating resource dynamically depending on the data necessary for relay transmission, by optimizing the control channel for relay transmission and minimizing resource amount to be allocated.

Means for Solving the Problem

In accordance with an aspect of the present invention, a backhaul subframe channel transmission method of a base station in a mobile communication system includes generating a downlink relay control channel by encoding downlink relay control information to be transmitted to a relay; mapping the downlink relay control channel to first slot of semi-static resource region allocated to the relay; and transmitting a backhaul subframe including the downlink relay control channel to the relay.

In accordance with another aspect of the present invention, a backhaul subframe channel reception method of a relay in a mobile communication system includes receiving a downlink relay control channel in a first slot of a semi-static resource region allocated to the relay; checking relay backhaul data information using the downlink relay control information; and receiving backhaul data using the downlink relay control information.

In accordance with another aspect of the present invention, a base station for transmitting a backhaul subframe in a mobile communication system includes a relay control channel generator which generate a downlink relay control channel by encoding downlink relay control information to be transmitted to a relay; a controller which maps the downlink relay control channel to first slot of semi-static resource region allocated to the relay; a relay data generator which generates a relay data channel to be transmitted to a relay; a multiplexer which multiplexes reference signal, the downlink relay control channel signal, and the relay data channel signal; and a transmitter which transmits the backhaul subframe including the downlink relay control channel to the relay.

In accordance with still another aspect of the present invention, a relay for receiving a backhaul subframe in a wireless communication system includes a channel estimator which estimate a backhaul channel using a reference signal included in the received backhaul subframe; a relay control channel receiver which receives a downlink relay control channel in a first slot of semi-static resource region allocated to the relay; and a relay data channel receiver which receives backhaul data using downlink relay control information included in the received downlink relay control channel.

Advantageous Effects

The method and apparatus for transmitting and receiving backhaul subframe in a wireless communication according to the present invention is capable of minimize overhead as compared to the conventional control channel transmission technique. The method and apparatus for transmitting and receiving backhaul subframe in a wireless communication according to the present invention also is capable of reducing the control channel resource necessary for retransmission and multiple backhaul subframe transmission.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Terms and words used in the specification and claims must be regarded as concepts selected by the inventor as the best method of illustrating the present invention, and must be interpreted as having meanings and concepts adapted to the scope and sprit of the present invention to understand the technology of the present invention.

Although the description is directed to the LTE and LTE-Advanced systems, the present invention can be applied to other radio communication system operating with base station scheduling with or without minor modifications.

[First Embodiment]

Figure 1:
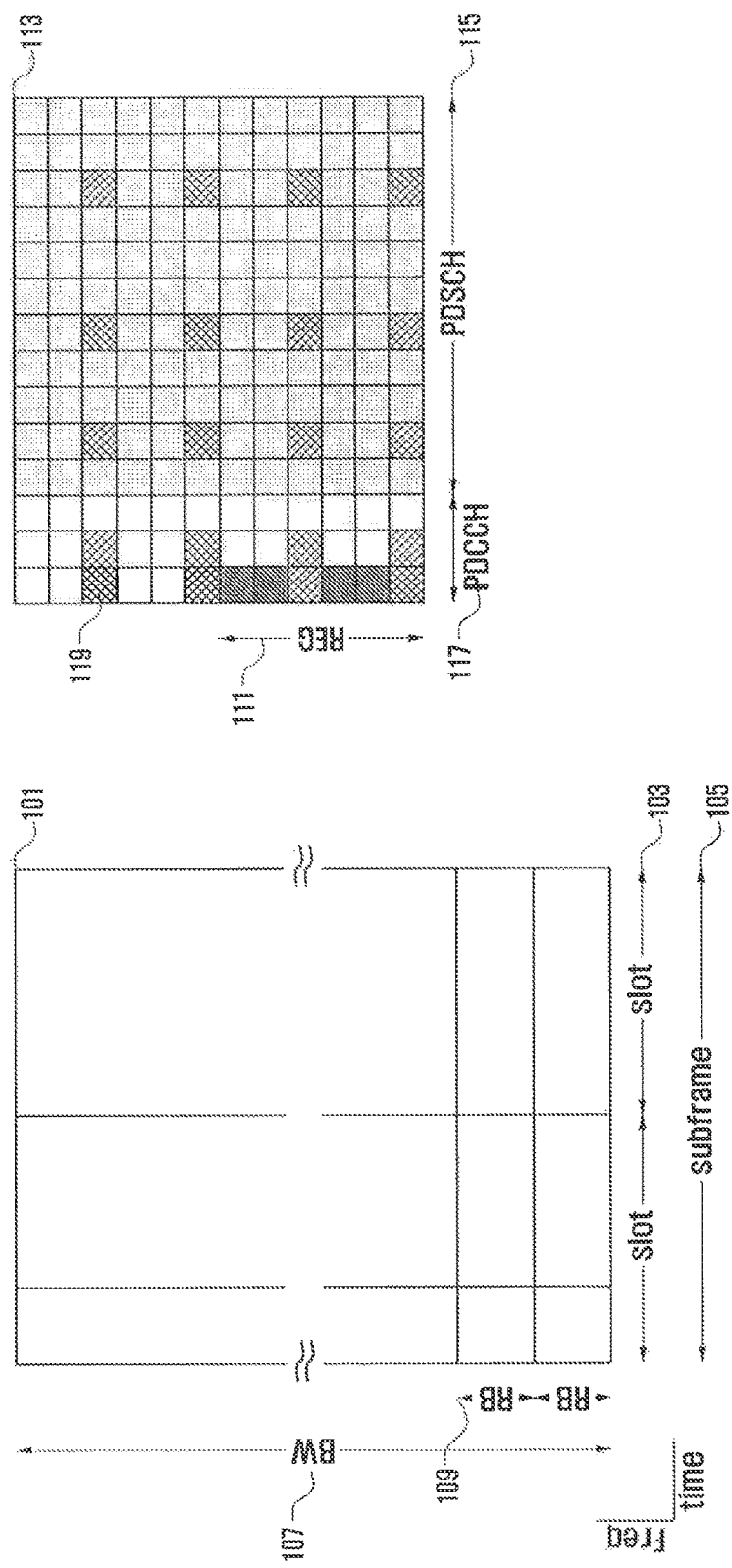
FIG. 1 is a diagram illustrating a configuration of subframe for use in LTE (Long Term Evolution) system to which the present invention is applied.
Figure 2:
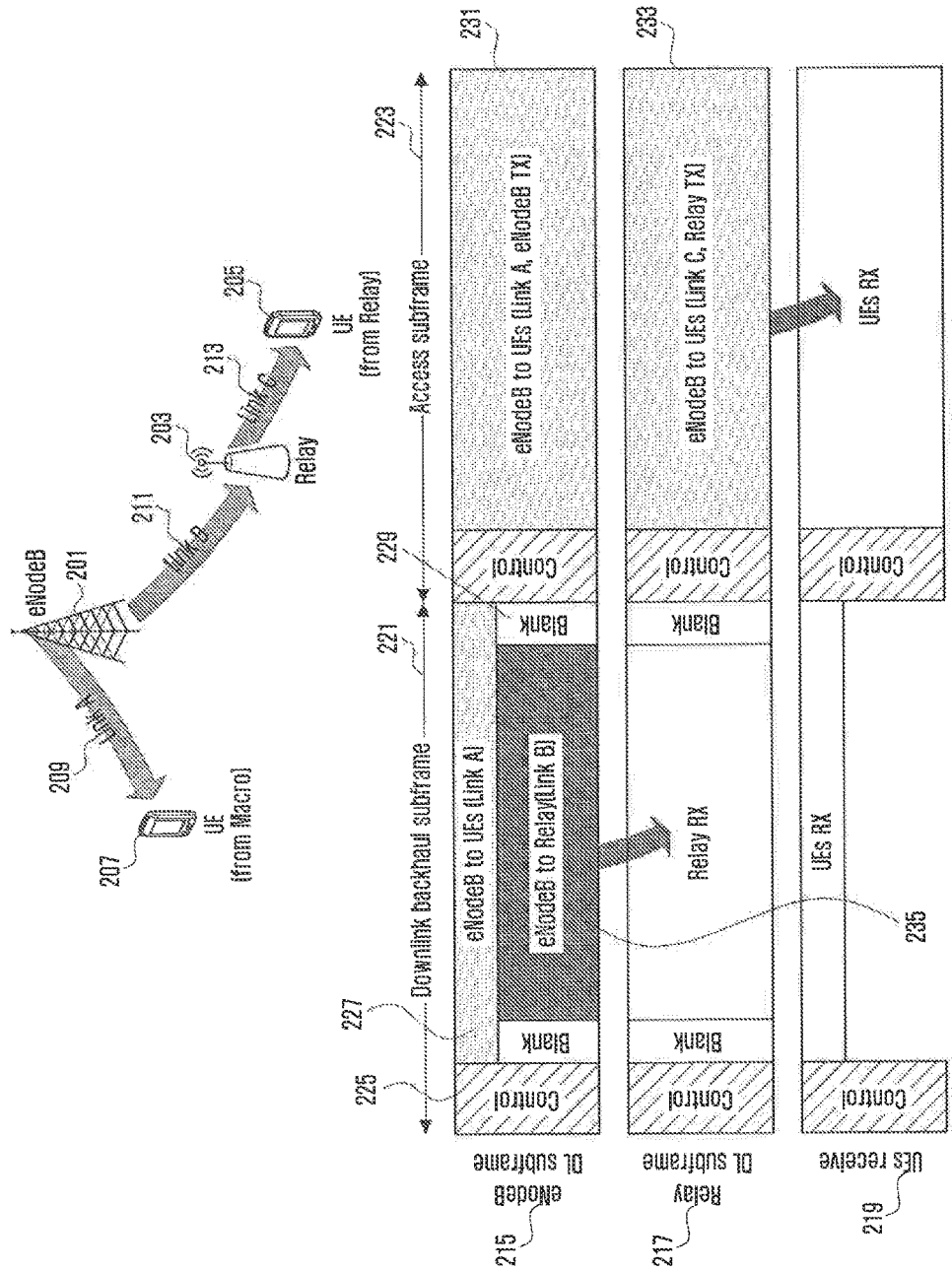
FIG. 2 is a diagram illustrating a relationship between frames transmitted to and received from the relay in the OFDM-based system.
Figure 3:
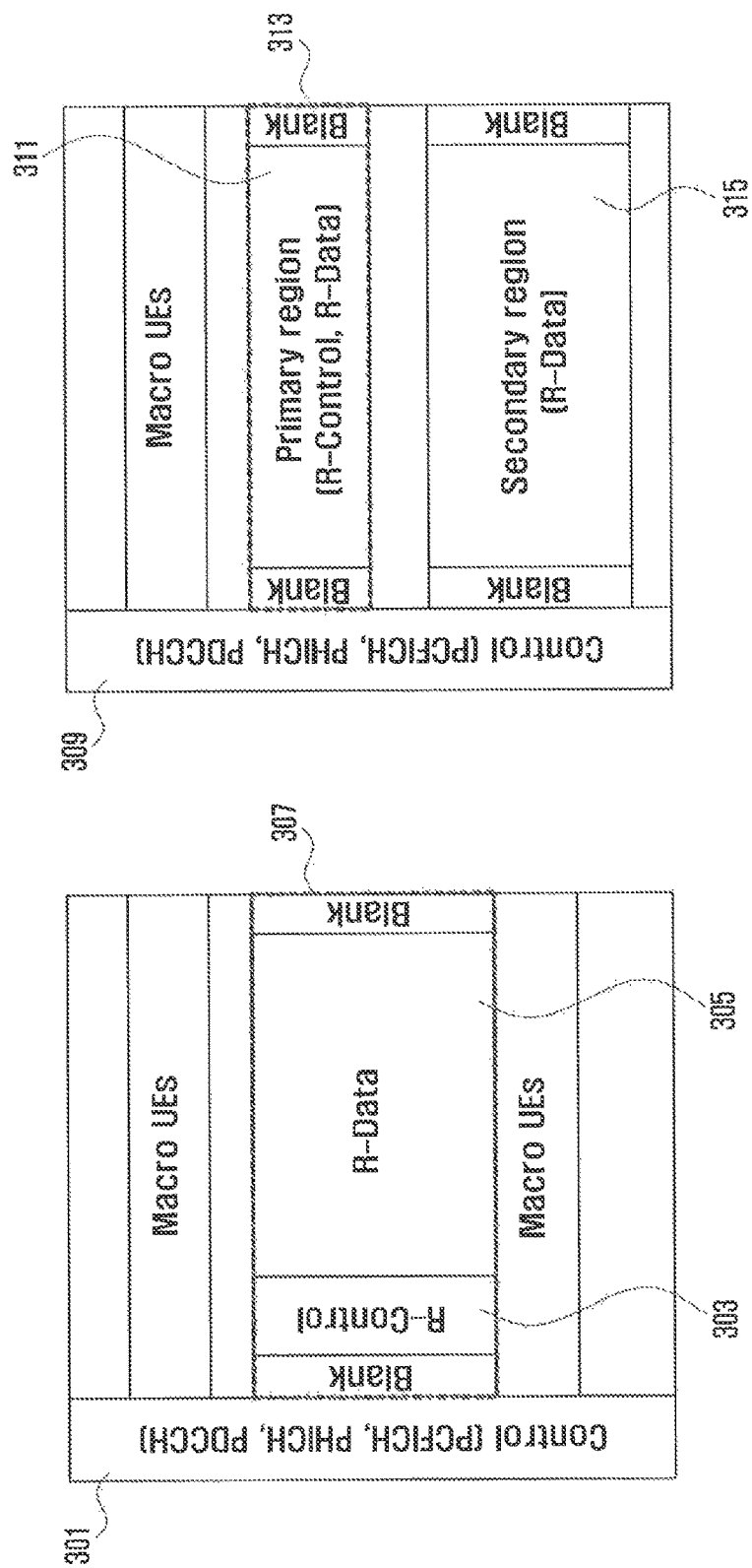
FIG. 3 is a diagram illustrating configurations of backhaul subframe of the relay in the legacy LTE system.
Figure 4:
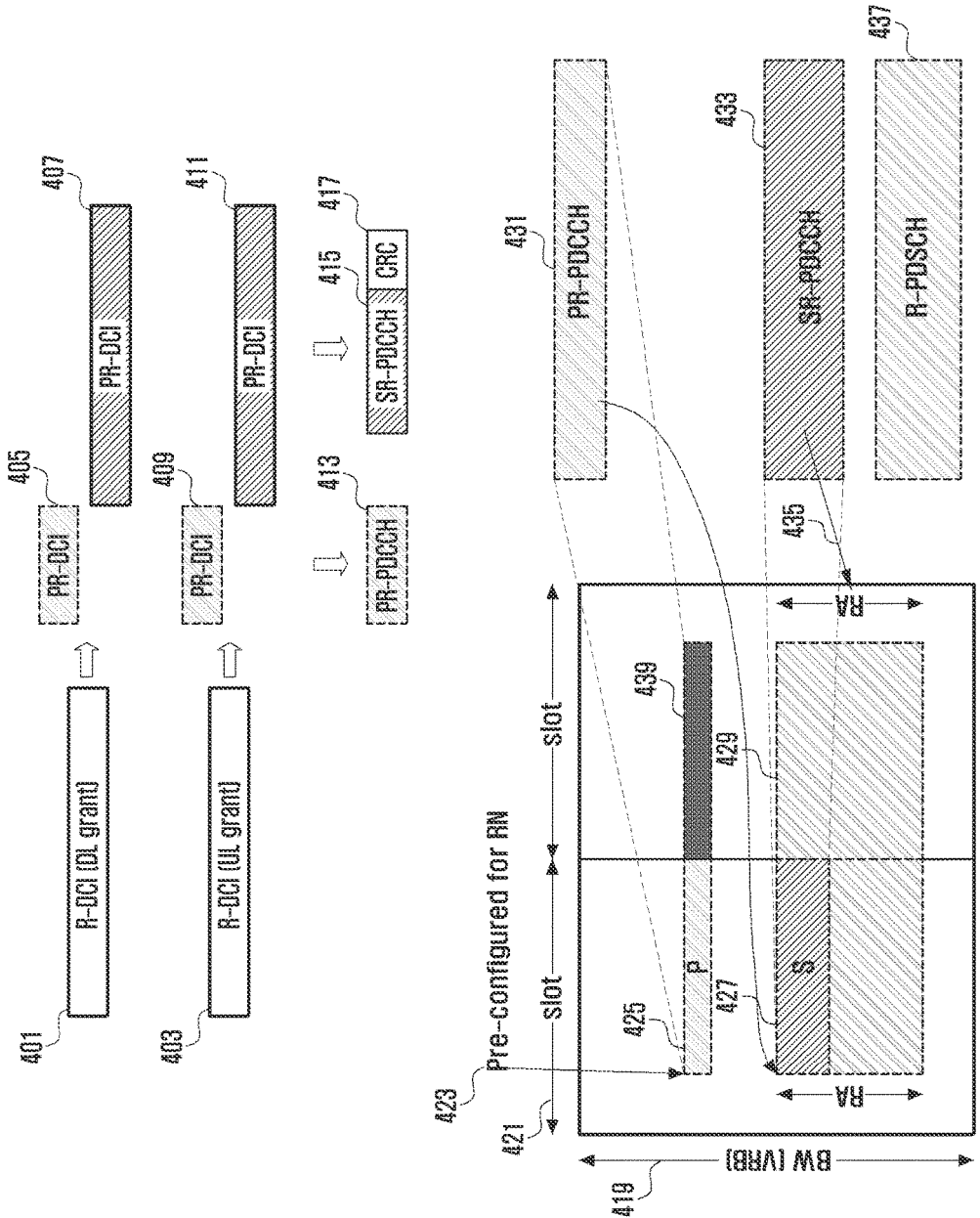
FIG. 4 is a diagram illustrating a configuration of a relay backhaul subframe according to the first embodiment of the present invention.

FIG. 4 is a diagram illustrating a configuration of a relay backhaul subframe according to the first embodiment of the present invention.

Referring to FIG. 4, the method proposed in the first embodiment of the present invention is to transmit the controls information necessary for relay backhaul control as divided in stepwise manner. In the present invention, the control channel used in the relay backhaul is defined as relay control channel (R-PDCCH). R-PDCCH is defined by relay control information (R-DCI) and can be categorized into two or more types depending on the information property. That is, the control information can be categorized into downlink relay control information (DL DCI) 401 and uplink relay control information (UL DCI) 403.

In the legacy LTE system, DL-DCI and UL-DCI are transmitted in individual PDCCHs, and the UE searches for its own PDCCH in the entire PDCCH search space. However, the configuration proposed in the present invention does not use the PDCCH region of the UE as well as has relays less than UEs in number such that the relay control informations are discriminated into primary information and secondary information. The primary information is the information to be transmitted preferentially among the relay control informations as denoted by reference number 405 and 409, and the primary informations of R-DCIs are aggregated and then joint-coded into a primary relay control channel (PR-PDCCH) 413, and the secondary informations as denoted by reference numbers 407 and 411 are aggregated and then joint-coded into a secondary relay control channel (SR-PDCCH) 415. However, since CRC is performed on the secondary relay control channel (SR-PDCCH) 415 but not on the primary relay control channel (PR-PDCCH) 413, only the SR-PDCCH 415 includes CRC sequence 417.

The CRC sequence 417 is the sequence for checking error in the received signal, and when the relay control channels are categorized into primary relay control channel and secondary relay control channel as proposed in the present invention and if neither the primary relay channel nor the secondary relay control channel is received, it is impossible to demodulate the relay data signal but possible to determine whether the relay control channel is received successfully regardless of whether the primary relay control channel is received successfully. Accordingly, it is possible to attach the CRC to only the secondary relay control channel.

Since the primary relay control channel can be transmitted in one RB, it is advantageous to minimize the resource allocated for the primary relay control channel. Accordingly, the receipt of the primary relay control channel is attempted in one RB 425. The primary relay control channel 425 can be transmitted in unit of slot 421 especially in odd-numbered slots or across two contiguous slots 425 and 439. The primary relay control channel also can be transmitted using some symbols in a specific region ad denoted by reference number 425.

In the present invention, the primary relay control channel indicates the start point of the RB of secondary relay control channel and relay data channel (R-PDSCH). Unlike the legacy LTE system in which the start point and length of the RB allocation are informed, the primary relay control channel according to the present invention informs of only the start point of the RB allocation excluding the length of the RB allocation. Since the overhead is reduced in the primary relay control channel, it is possible to minimize the entire RB allocation amount.

By referencing the start point of the RB allocation in the primary relay control channel, the relay receives the second relay control channel 433 in the region determined by shifting to the corresponding RB. Likewise, the secondary relay control channel 433 can be transmitted in the first slot as denoted by reference number 427 or across two contiguous slots. It is also possible to transmit using a specific symbol.

The secondary relay control channel 433 includes the information necessary for data transmission/reception and decoding and dynamic allocation information on relay data and, in this embodiment, the information on the length of the dynamic allocation region in downlink, downlink data decoding information, and all uplink scheduling information are joint-coded to be transmitted. The secondary relay control channel 433 includes the information on the length of the downlink dynamic allocation region with which it is possible to recognize the entire RB allocation amount 435 and transmitting relay data channel in the region excluding the secondary relay control channel 433. The relay data channel also can be transmitted in the symbol carrying the primary relay control channel 425 or end part of the slot.

The resource allocation can be configured by negotiation between the relay and the eNB in advance through higher layer signaling. In this case, the resource can be allocated in the initial connection process of the relay and reallocated after a predetermined time elapse. The relay notifies the eNB of the resource candidates having the best frequency selectivity in the initial resource allocation or reallocation process such that the eNB can configure the allocation resource appropriately using the information provided by the relay. In this case, it is possible to allocate different single RBs to individual relays or multiple RBs that can be discriminated from each other according to a predetermined rule. Such a resource allocation procedure can be applied to all of the embodiments described hereinafter.

Figure 5:
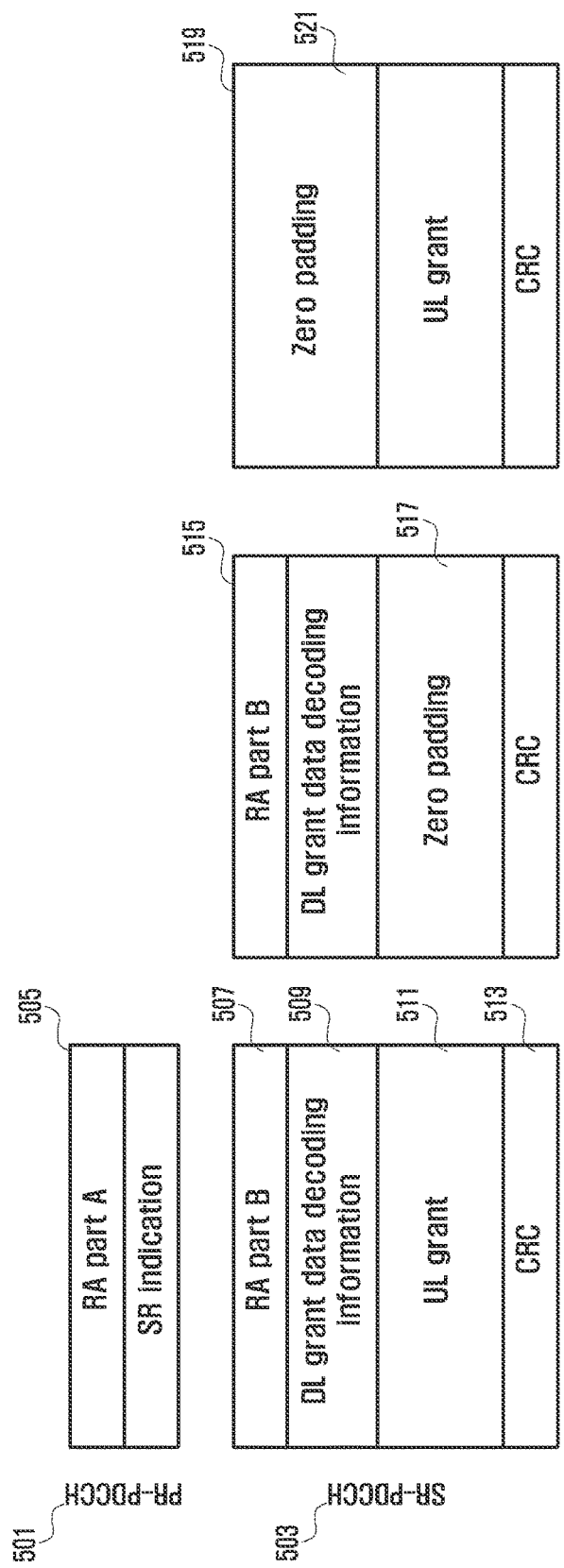
FIG. 5 is a diagram illustrating a configuration of relay control channel information according to the first embodiment of the present invention.

FIG. 5 is a diagram illustrating a configuration of relay control channel information according to the first embodiment of the present invention.

Referring to FIG. 5, since the primary information of the downlink relay control information and the primary information of the uplink relay control information are partially identical with each other and just one information on the location of the dynamic resource carried in the secondary relay control channel 503 is necessary, the primary relay control channel 501 is transmitted by joint coding the individual primary informations. Such a transmission method has the effect of reducing the overhead by half as compared to the independently decoded transmission or the convention control channel transmission method. If it is possible to include secondary relay control channel configuration information (SR-indicator), the join coding process can be skipped in the primary relay control channel 501 generation procedure.

In case that the join coding process is included in the procedure for generating the primary relay control channel 501, it is possible to adjust the resource allocated for the secondary relay control channel transmitted to the relay dynamically, however, if error occurs while receiving the primary relay control channel 501, the entire information is lost. Accordingly, when the primary relay control channel has no information on the resource allocation state of the secondary relay control channel 503, the space having no information is filled with zero padding as denoted by reference number 517. This method is advantageous to receive the secondary relay control channel 503 even when an error occurs in receiving the primary relay control channel 501, in spite of resource waste in the zero padding region.

Reference number 505 denotes a configuration including both the downlink relay control information and uplink relay control information, reference number 515 denotes a configuration including only the downlink relay control information, and reference number 519 denotes a configuration including only the uplink relay control information.

The technique proposed in the first embodiment is advantageous to minimize the scheduling restriction of the scheduler and allocates dynamic resource to the relay in the same process to the UE connected to the eNB by allocating minimum resource (one RB) to the relay and transmitting some of the conventional control channel. Through such a dynamic resource allocation, it is possible to perform frequency selective scheduling and transmit only the information with exception of the same information due to the joint coding of the downlink relay control information and uplink relay control information.

As aforementioned, if the current backhaul subframe includes only the downlink relay control information or uplink relay control information, the uplink relay control information that should be included in the secondary relay control channel is replaced by zero padding so as to cause some resource waste but reduce the number of coding times by half as compared to the case where the informations are transmitted the information independently due to the use of single control channel format.

Figure 6:
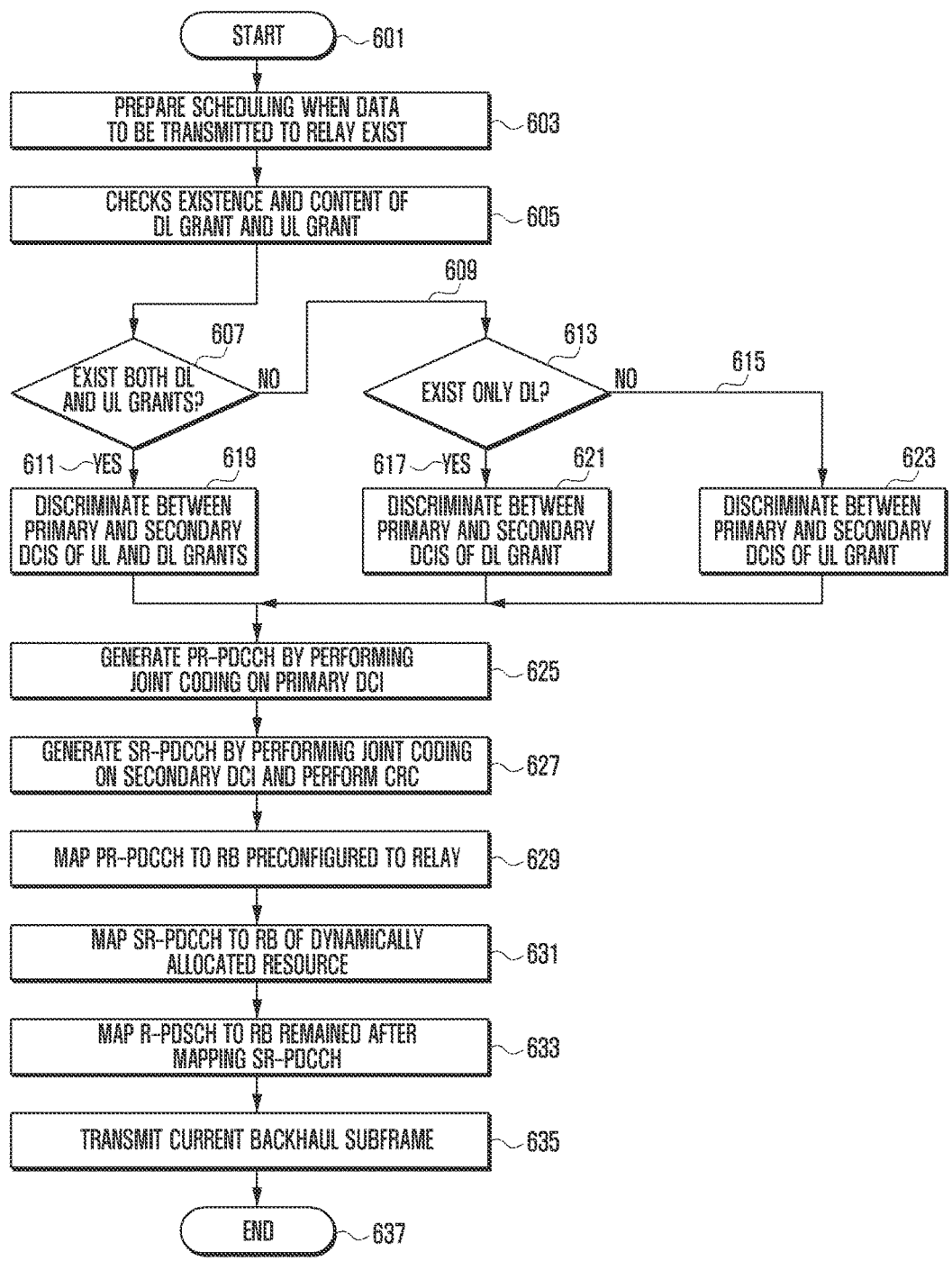
FIG. 6 is a flowchart illustrating an eNB's transmission procedure according to the first embodiment of the present invention.

FIG. 6 is a flowchart illustrating an eNB's transmission procedure according to the first embodiment of the present invention.

Referring to FIG. 6, the eNB checks the data to be transmitted to the relay and prepares scheduling (603) and checks the existence and content of downlink relay control information and uplink relay control information (605).

Next, the eNB determines whether there exists both the downlink relay control information and uplink relay control information (607) and, if both the downlink and uplink relay control informations exist (611), differentiates between primary information and secondary information in each of the uplink and downlink relay control informations (619). Otherwise, if both the downlink and uplink relay control informations do not exist (609), the eNB determines whether only the downlink relay control information exists (613).

If it is determined that only the downlink relay control information exists (617), the eNB differentiates between primary information and secondary information in the downlink relay control information (621). If it is determine that only the uplink relay control information exists (615), the eNB differentiates between primary information and secondary information in the uplink relay control information (623).

Next, the eNB performs joint coding on the discriminated primary informations aggregated to configure the primary relay control channel (625). At this time, the Cyclic Redundancy Check (CRC) is not performed. Next, the eNB performs Joint coding on the secondary information aggregated to configure the secondary relay control channel (627). At step 627, the CRC is not performed.

Next, the eNB maps the primary relay control channel in the resource region allocated to each relay (629) and the secondary relay control channel to the resource region indicated by the primary relay control channel in the dynamic resource allocation region (631). Next, the eNB maps the relay data channel in the region remained after mapping the secondary relay control channel (633). Finally, the eNB completes the resource allocation and transmits a backhaul subframe (637).

Figure 7:
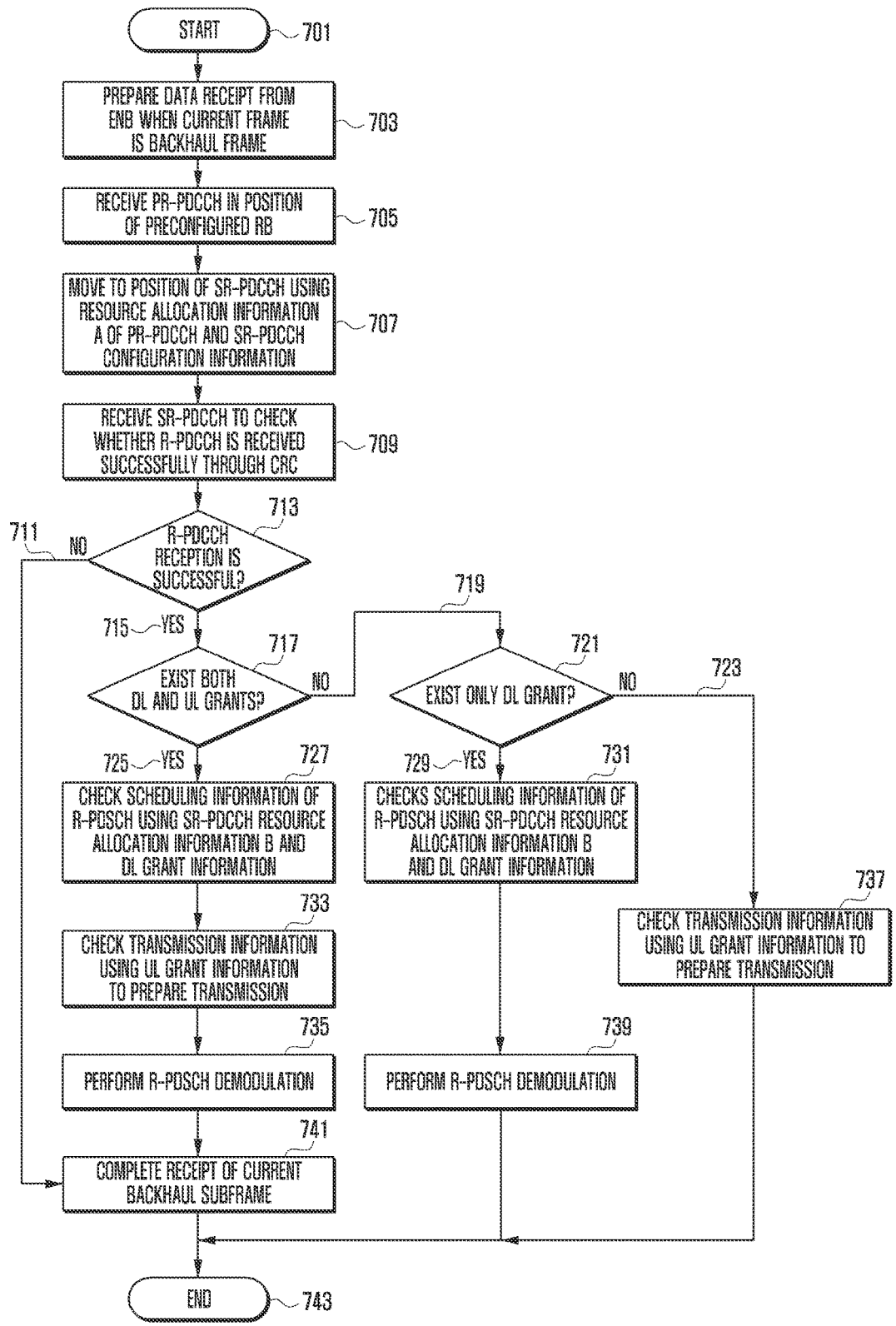
FIG. 7 is a flowchart illustrating a relay's reception procedure according to the first embodiment of the present invention.

FIG. 7 is a flowchart illustrating a relay's reception procedure according to the first embodiment of the present invention.

Referring to FIG. 7, the relay checks the currently received subframe as backhaul subframe (703) and receives primary relay control channel in the corresponding region of the allocated resource (705). Next, the relay receives the secondary relay control channel indicated in the previously received primary relay control channel (707). Once all the relay control channels are receives, the relay performs received error check using the CRC sequence included in the secondary relay control channel (709).

Next, the relay determines whether the relay control channel is received successfully (713). If it is failed to receive the relay control channel (711), the relay stops receiving the corresponding subframe (741) and, otherwise if the relay control channel is received successfully, determines whether the relay control channel includes both the downlink relay control information and uplink relay control information (717). If the relay control channel includes both the downlink and uplink relay control informations (725), the relay checks the scheduling information on the relay backhaul data channel using the downlink relay control information (727), checks the scheduling information using the uplink relay control information to prepare transmission (733), and performs receiving and demodulating on the backhaul data using the downlink relay control information (735).

If the relay control channel does not include both the downlink and uplink relay control informations (719), the relay determines whether the relay control channel includes downlink relay control information (721). If it is determined that the relay control channel includes downlink relay control information (729), the relay checks the scheduling information on the relay backhaul data channel using the downlink relay control information (731) and performs receiving and demodulation on the backhaul data (739).

If it is determined that the relay control channel includes uplink relay control information (723), the relay checks the scheduling information by referencing the uplink relay control information to prepare transmission (737).

[Second Embodiment]

Figure 8:
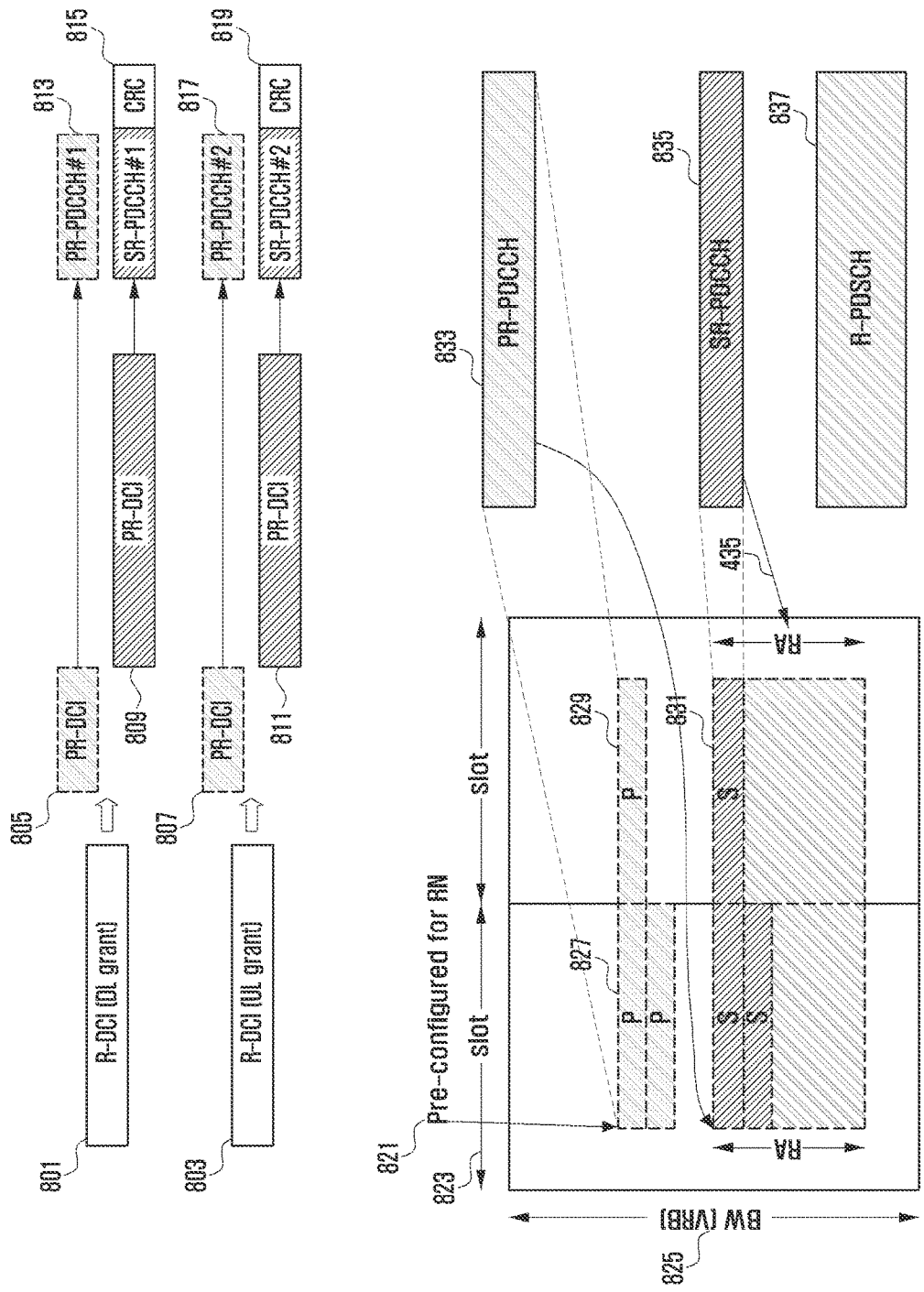
FIG. 8 is a diagram illustrating a configuration of a backhaul subframe according to the second embodiment of the present invention.

FIG. 8 is a diagram illustrating a configuration of a backhaul subframe according to the second embodiment of the present invention.

Referring to FIG. 8, the method proposed in the second embodiment transmits the uplink/downlink relay control informations necessary for relay backhaul control separately in stepwise manner so as to perform separate coding on the primary information of the control information to configure two primary relay control channel (PR-PDCCH) and two secondary relay control channel (SR-PDCCH). The primary relay control channel receptions can be attempted to one RB 827 and 829, the slot proceeding on the time axis of two RBs, or some symbols included in the two RBs. The secondary relay control channel also can be mapped in the same manner as the primary relay control channel. The informations included in the primary information and the secondary information are identical with those of the first embodiment. In the second embodiment, the number of primary relay control channel can be 1 or 2 depending on the existence of the downlink relay control information and the uplink relay control information FIG. 9 is a diagram illustrating a configuration of relay control channel information according to the second embodiment of the present invention.

Figure 9:
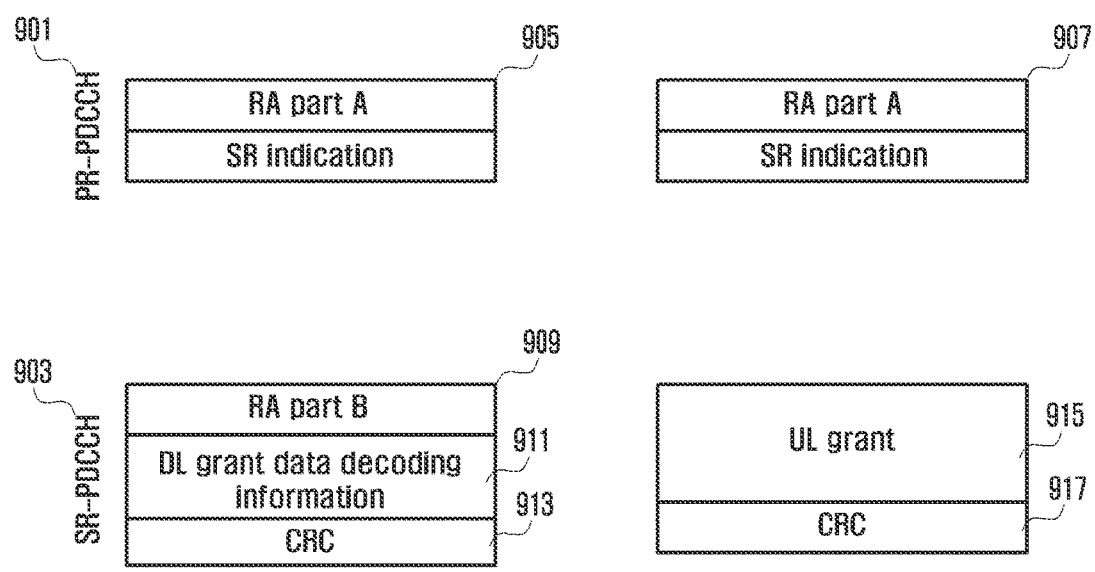
FIG. 9 is a diagram illustrating a configuration of relay control channel information according to the second embodiment of the present invention.

Referring to FIG. 9, the downlink relay control information and the uplink relay control information are coded separately, two primary relay control channels 901 exist as denoted by reference 905 and 907, and two secondary relay control channels 903 exist. In view of resource allocation, the primary relay control channel 901 is mapped to a part of the allocated RB in the same manner as the first embodiment. In case of mapping to two RBs, the relay should be allocated two resources in access process. The secondary relay control channel 903 is mapped to a designated region in the primary information.

In the second embodiment, since the individual informations are transmitted on different channels using only the previously allocated resource (1 RB or two RBs), there is no resource waste of zero padding caused by Joint coding and the reception error occurred in one of the downlink and uplink relay control channels influences only to the corresponding information. Unlink the case using Joint coding in which all informations are lost by an error, the second embodiment is capable of receiving the scheduling information in spite of error occurrence.

Figure 10:
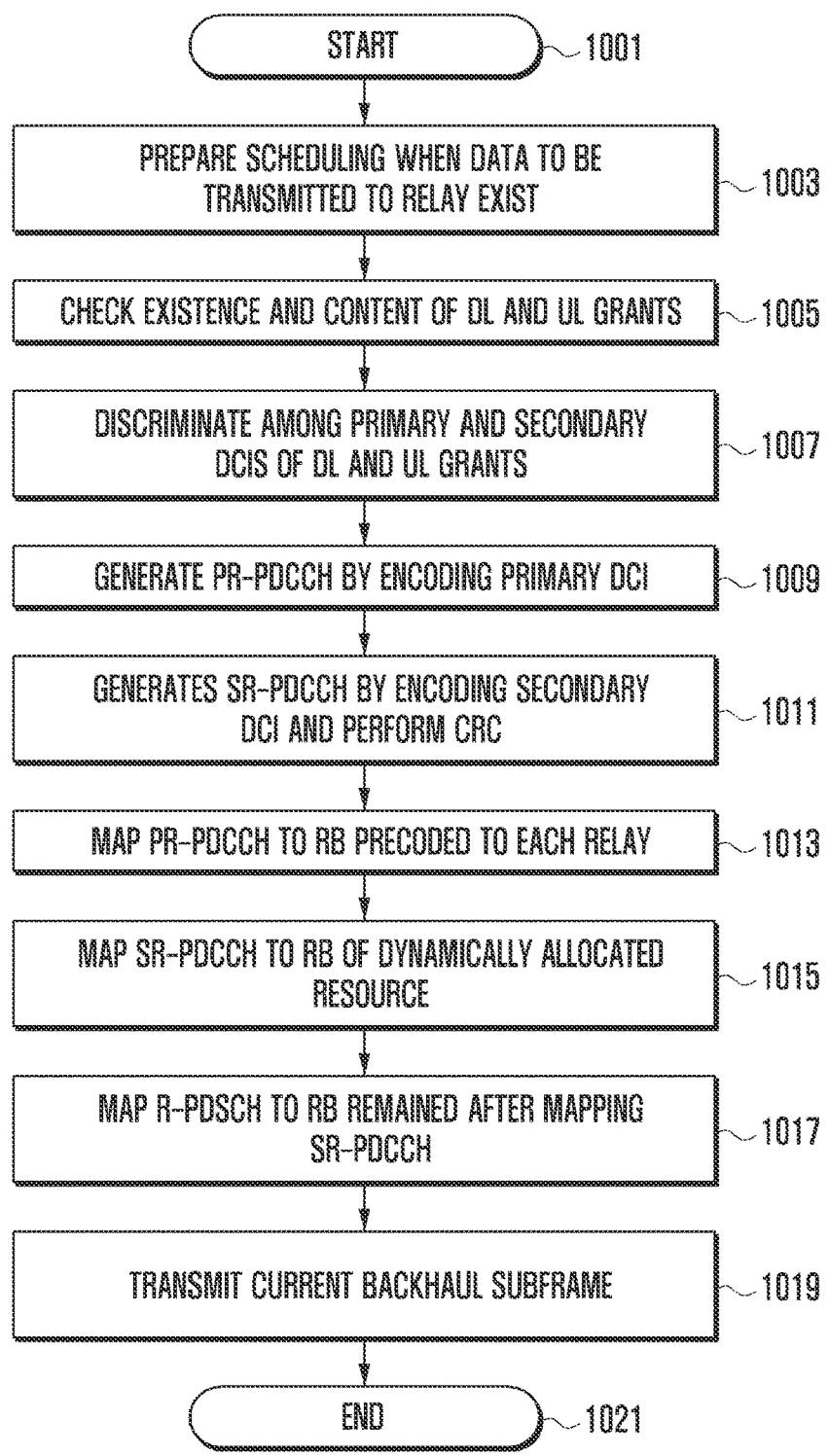
FIG. 10 is a flowchart illustrating an eNB's transmission procedure according to the second embodiment of the present invention.

FIG. 10 is a flowchart illustrating an eNB's transmission procedure according to the second embodiment of the present invention.

Referring to FIG. 10, the eNB checks data to be transmitted to the relay (1003) and checks the existence and content of the downlink relay control information and uplink relay control information (1005). Next, the eNB discriminates among primary information and secondary informations (1007) and encodes the discriminated primary informations into a primary relay control channel. At this time, the CRC process is not performed (1009).

Next, the eNB encodes the secondary informations into a secondary relay control channel with CRC process (1011). Next, the eNB maps the primary relay control channel to the resource region allocated to the relay (1013) and maps the secondary control channel to a resource region of the dynamic resource allocation which is indicated by the primary relay control channel (1015).

Next, the eNB maps the relay data channel to the region remained after mapping the secondary relay control channel (1017). Once the mapping process has completed, the eNB transmits a backhaul subframe (1019).

Figure 11:
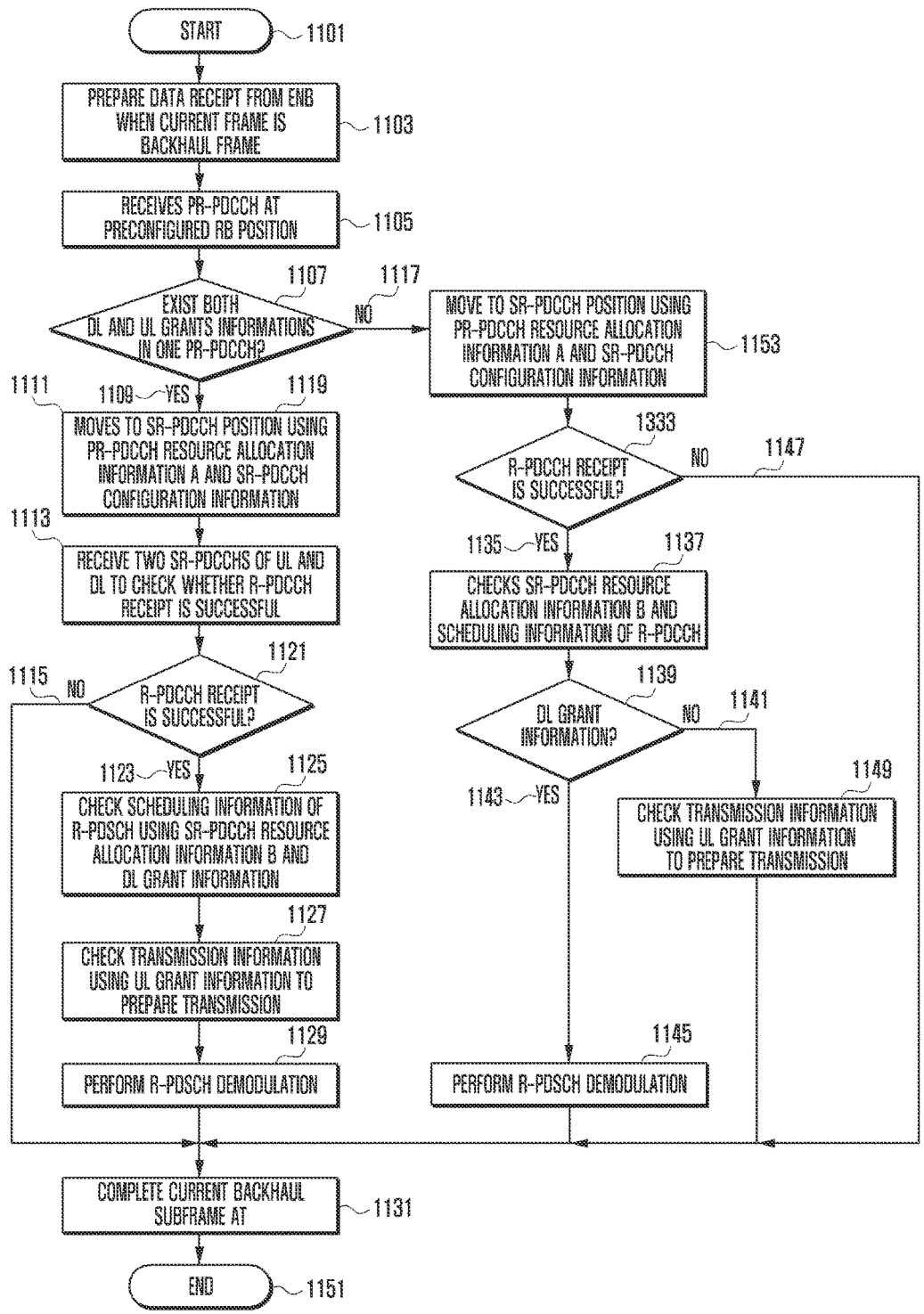
FIG. 11 is a flowchart illustrating a relay relay's reception procedure according to the second embodiment of the present invention.

FIG. 11 is a flowchart illustrating a relay relay's reception procedure according to the second embodiment of the present invention.

Referring to FIG. 11, the relay checks the currently received subframe is a backhaul subframe (1103) and receives the primary relay control channel in the corresponding region of the allocated RB (1105).

Next, the relay determines whether the primary relay control channel includes downlink relay control information or uplink relay control information or both using the received information (1107). If it is determined that the primary relay control channel includes both the downlink and uplink relay control informations (1109), the relay receives the secondary relay control channel at the position indicated by the primary relay control channel (1111), performs CRC on the secondary relay control channel (1113), and determines whether the relay control channel is received successfully (1121).

If the relay control channel reception fails (1115), the relay stops receiving the corresponding subframe and, otherwise if the relay control channel reception succeeds (1123), checks the scheduling information on the relay backhaul data channel using the downlink relay control information (1125), and checks the scheduling information using the uplink relay control information to prepare transmission (1127). Next, the relay performs receiving and demodulation on the backhaul data using the downlink relay control information (1129).

If it is determined that the primary relay control channel does not include both the downlink and uplink relay control informations (1117), the relay determines whether the primary relay control information includes downlink relay control information (1139). If it is determined that the primary relay control information includes the downlink relay control information (1143), the relay checks the scheduling information on the relay backhaul data channel using the downlink relay control information (1145) and, otherwise if it is determined that the primary relay control information includes the uplink relay control information (1141), checks the scheduling information using the uplink relay control information to prepare transmission (1149).

[Third Embodiment]

Figure 12:
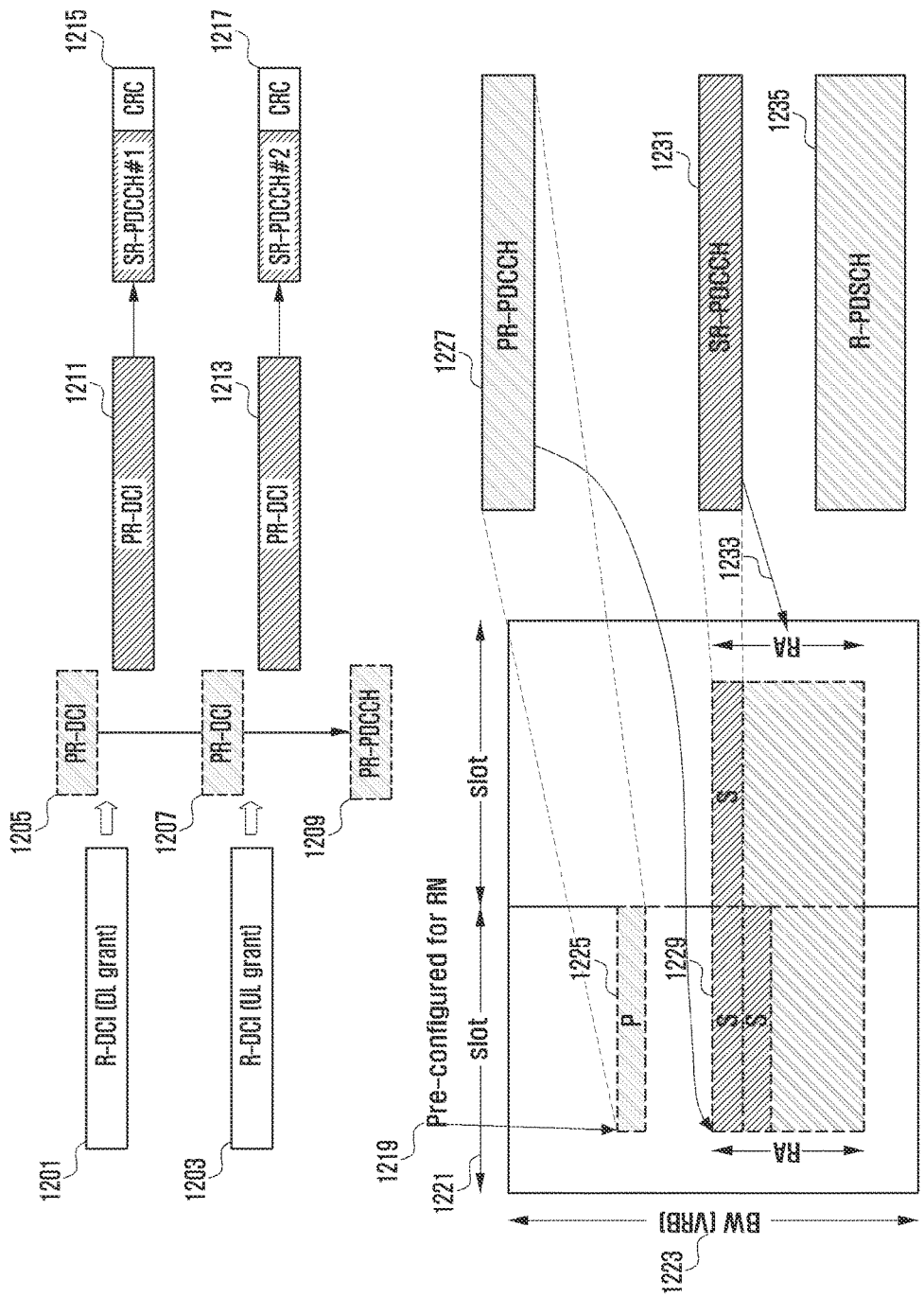
FIG. 12 is a diagram illustrating a configuration of a backhaul subframe according to the third embodiment of the present invention.

FIG. 12 is a diagram illustrating a configuration of a backhaul subframe according to the third embodiment of the present invention.

Referring to FIG. 12, the method proposed in the third embodiment is for configuring one primary relay control channel (PR-PDCCH) and two secondary relay control channels (SR-PDCCH) 1215 and 1217 by transmitting the control information necessary for relay backhaul control separately in stepwise manner with the joint coding on the primary information 1205 and 1207 among the control informations discriminated among primary informations 1205 and 1207 and secondary informations 1211 and 1213 and the separate coding on the secondary informations 1211 and 1213.

That is, the primary relay control channel 1209 is generated by performing the joint coding on aggregation of the primary information 1205 included in the downlink relay control information 1201 and the primary information included in the uplink relay control information 1205, and the two secondary relay control channel 1215 and 1217 are generated by performing the separate coding on the respective secondary information 1211 and 1213 included in the uplink relay control information 1203 and the downlink relay control information 1201.

The primary relay control channel 1209 reception is attempted on one allocated RB and includes the information on the two secondary relay control channels 1215 and 1217 and the RB allocation start position of the relay data channel (R-PDSCH) 1235. Since there are two secondary relay control channels, the relay receives one secondary relay control channel using the informed RB position and the other secondary relay control channel on the next RB.

Reference numbers 1225 and 1229 denotes relay control channel allocation according to an embodiment. The primary relay control channel 1225 is transmitted in a slot or some symbols included in the slot, and the secondary relay control channel 1231 is transmitted in some slots of the RB or subframe or some symbols as indicated by the primary relay control channel 1225. In case that two secondary relay control channels exist, the secondary relay control channels can be transmitted across two RBs or in two separate slots.

Figure 13:
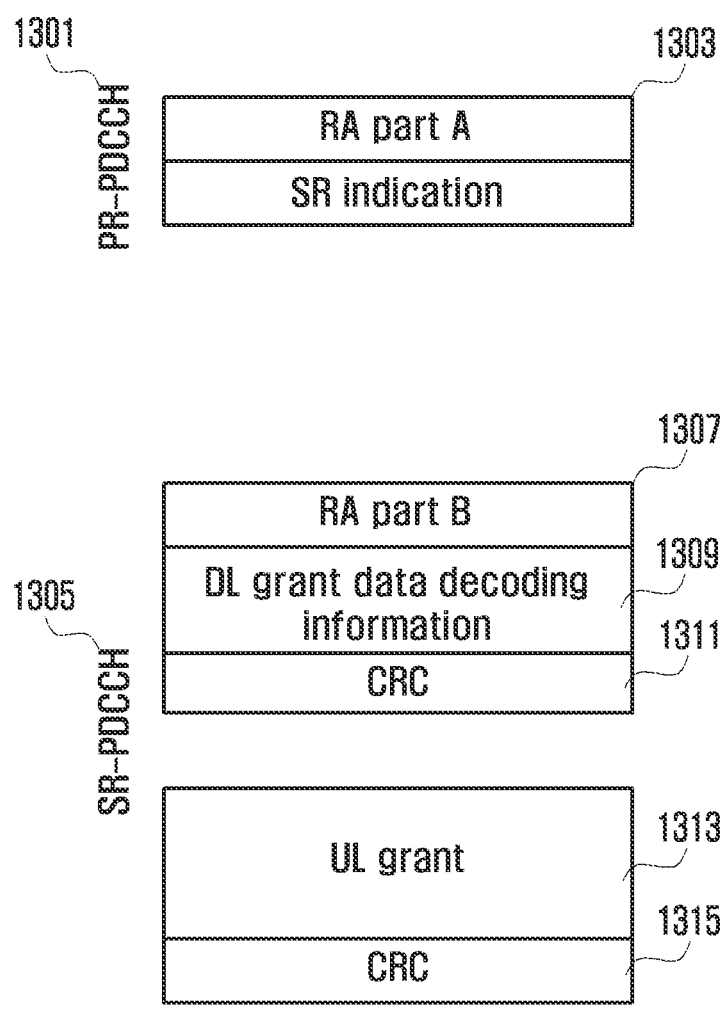
FIG. 13 is a diagram illustrating a configuration of relay control information according to the third embodiment of the present invention.

FIG. 13 is a diagram illustrating a configuration of relay control information according to the third embodiment of the present invention.

Referring to FIG. 13, there is one primary relay control channel 1301 configured by joint-coding the downlink relay control information and uplink relay control information as denoted by reference number 1303. The primary relay control channel indicates the resource allocation position for transmission of the secondary relay control channel and can include the information on the configuration state of the secondary relay control channel. In case that the configuration stat information is included, the resource amount allocated for the secondary relay control channel can be adjusted dynamically but, if an error occurs in receiving the primary relay control channel, all of the informations are lost while skipping the unnecessary reception attempt in the region carrying no secondary relay control channel. Reference numbers 1307 and 1313 denote the secondary informations of the downlink relay control information and the uplink relay control information included in the secondary relay control channel, respectively.

Figure 14:
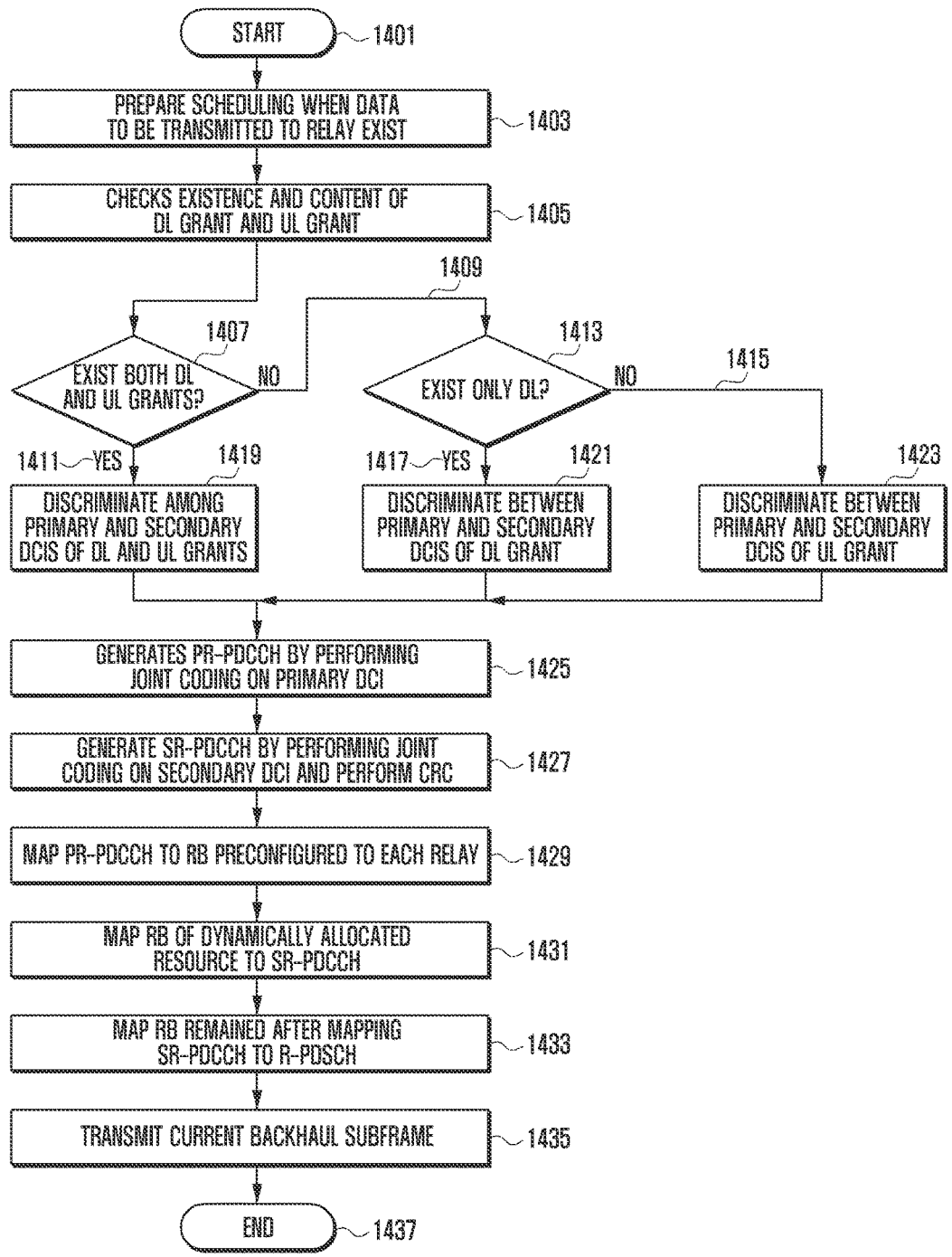
FIG. 14 is a flowchart illustrating an eNB's transmission procedure according to the third embodiment of the present invention.

FIG. 14 is a flowchart illustrating an eNB's transmission procedure according to the third embodiment of the present invention.

Referring to FIG. 14, the eNB checks the data to be transmitted to the relay (1403) and checks existence and content of downlink relay control information and uplink relay control information (1405). Next, the eNB determines whether both the downlink and uplink relay control informations are included (1407) and, if both are included (1411), discriminates among between the primary and secondary informations (1419). If not both the downlink and uplink relay control informations are included (1409), the eNB determines whether the downlink relay control information is included (1413).

If it is determined that only the downlink relay control information is included (1417), the eNB discriminate between primary information and secondary information in the downlink relay control information (1421). Otherwise if it is determined that only the uplink relay control information is included (1415), the eNB discriminates between the primary information and secondary information (1423) in the same manner as step 1421.

Afterward, the eNB configures the primary relay control channel by performing Join coding on the aggregation of the discriminated primary informations without CRC process (1425). The secondary relay control channels are configured by performing separate coding on the secondary informations with CRC process per secondary relay control channel.

Next, eNB maps the primary relay control channel to the resource region for each relay (1429) and the secondary relay control channel to RB position indicated by the primary relay control channel in dynamic resource allocation region (1431).

Next, the eNB maps the relay data channel to the region remained after mapping the secondary relay control channel (1433). Once the mapping process has completed, the eNB transmits the backhaul subframe (1435).

Figure 15:
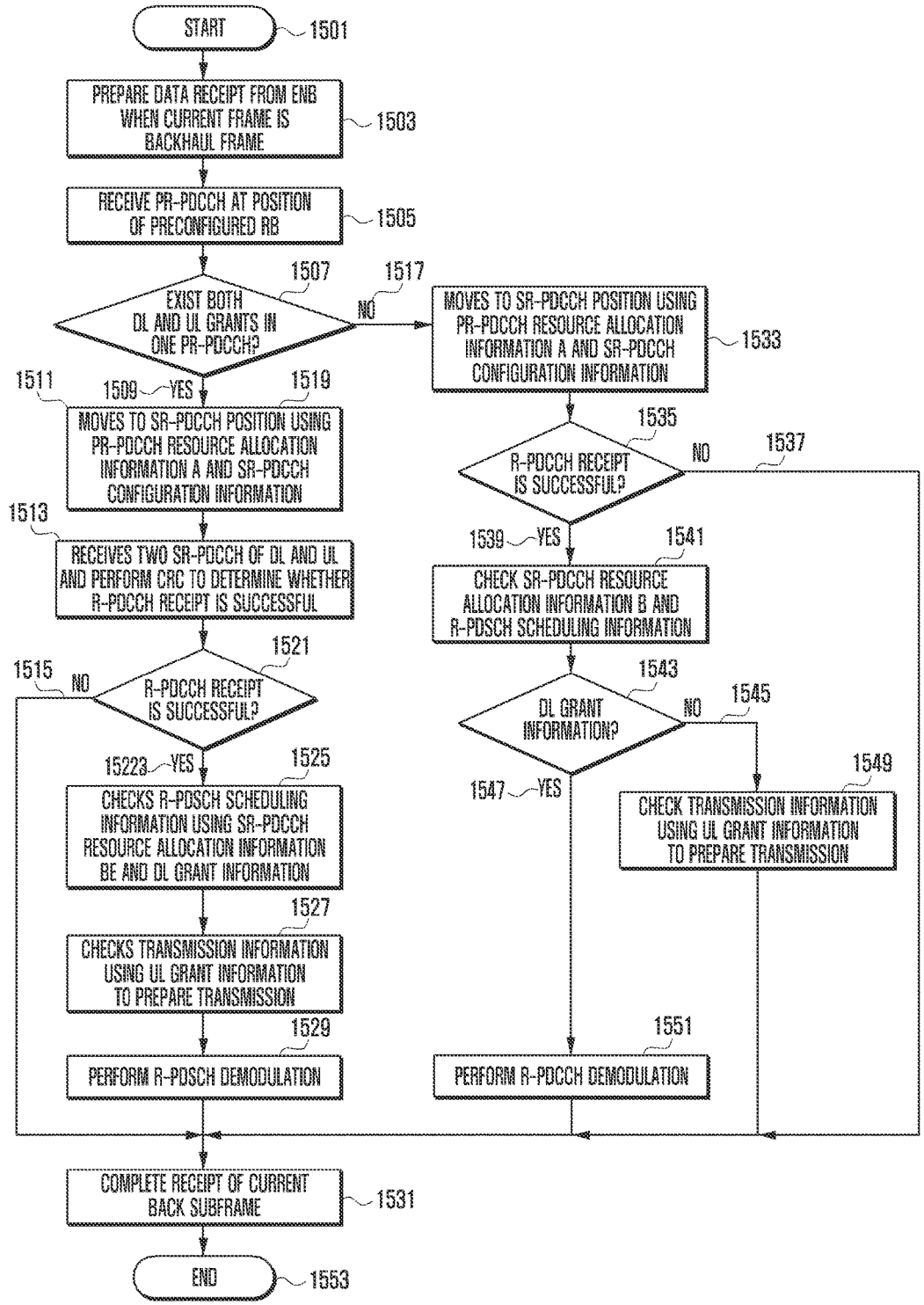
FIG. 15 is a flowchart illustrating a relay's reception procedure according to the third embodiment of the present invention.

FIG. 15 is a flowchart illustrating a relay's reception procedure according to the third embodiment of the present invention.

Referring to FIG. 15, the relay checks the currently received subframe as the backhaul subframe (1503) and receives primary relay control channel in the corresponding region of a previously allocated RB (1505). Next, the relay determines whether uplink secondary relay control channel and downlink secondary relay control channel exist by using the received primary relay control channel (1507).

If both the uplink and downlink secondary relay control channels exist (1509), the relay receives the secondary relay control channel at the position indicated by the primary relay control channel (1511) and performs received signal error check after all of the relay control channels are received (1513).

Next, the relay determines whether the relay control channels are received successfully (1521) and, if the relay control channel reception has failed (1515), stops receiving the corresponding subframe otherwise, if the relay control channel reception has succeeded (1523), the relay checks the scheduling information of the relay backhaul data channel using the downlink relay control information (1525) and checks the scheduling information in the uplink relay control information to prepare transmission (1527). Next, the relay performs receiving and demodulation on the backhaul data using the downlink relay control information (1529).

Meanwhile, the relay determines whether only the downlink relay control information exists (1543) and, if only the downlink relay control information exists (1547), performs reception and demodulation on the backhaul data (1551) and, otherwise if only the uplink relay control information exist (1545), checks the scheduling information of the uplink relay control information to prepare transmission (1549).

[Fourth Embodiment]

Figure 16:
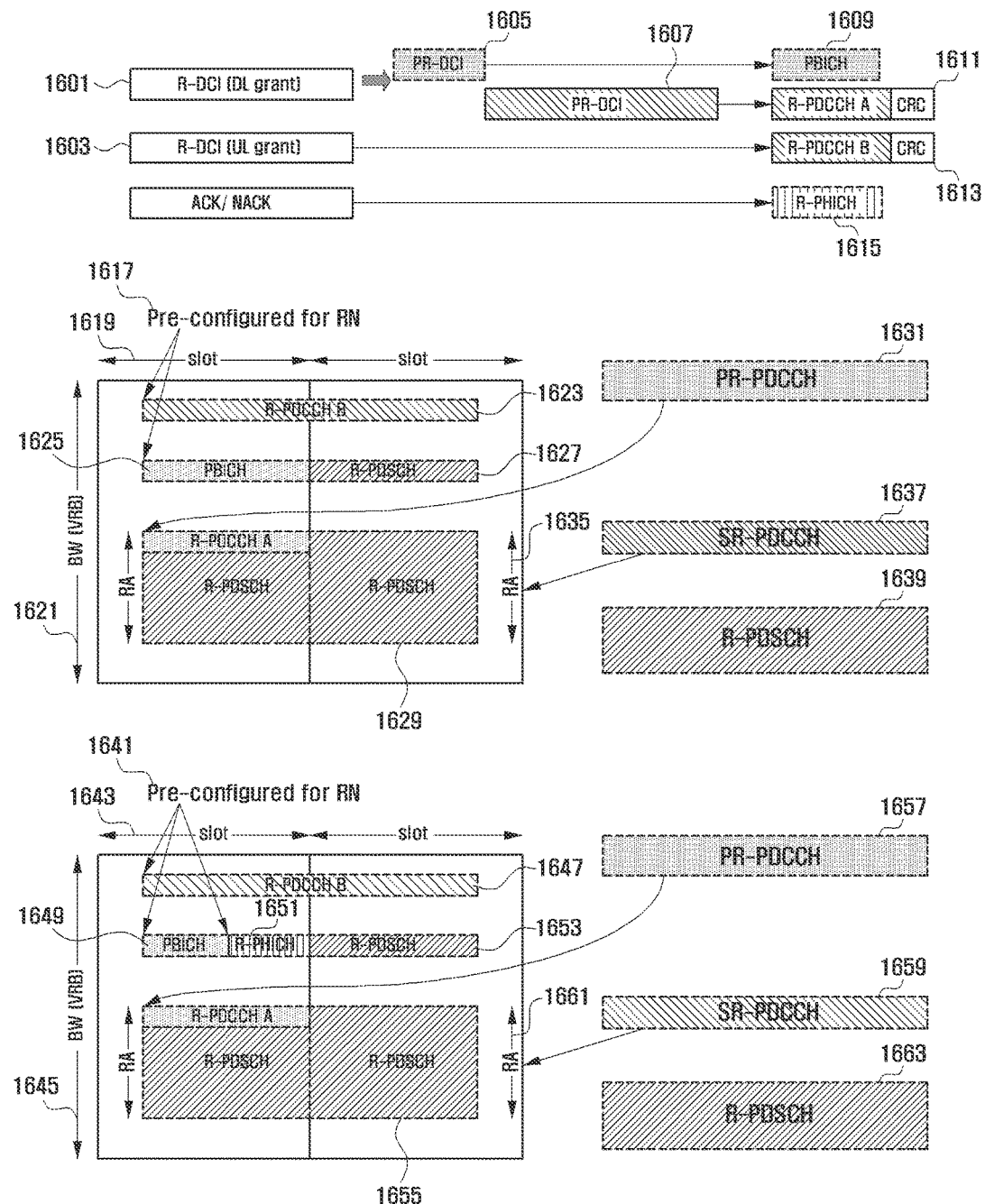
FIG. 16 is a diagram illustrating a configuration of a backhaul subframe according to the fourth embodiment of the present invention.

FIG. 16 is a diagram illustrating a configuration of a backhaul subframe according to the fourth embodiment of the present invention.

Referring to FIG. 16, the method proposed in the fourth embodiment is to differentiate the downlink relay control information 1601 between primary information 1605 and secondary information 1607 in the control information necessary for controlling the relay backhaul transmit the differentiated informations after coding separately and the uplink relay control information 1603 after coding separately. In the fourth embodiment, the primary information 1605 of the downlink relay control information 1601 and the uplink relay control information 1603 are mapped to the semi-static resource, and the secondary information 1607 of the downlink relay control information 1601 is mapped to the dynamic resource. Accordingly, in the fourth embodiment, the eNB must notify the relay of the positions of the tow semi-static resources through higher layer signaling.

In more detail, the primary information 1605 of the downlink relay control information 1601 mapped to the first slot 1625 of the semi-static resource region allocated to the relay and transmitted without CRC sequence. In order to discriminated the channel transmitting the primary information 1605 of the control information 1601 from that of the previously embodiment, the channel is referred to as Physical Backhaul Indication Channel (PBICH). The secondary information 1607 of the downlink relay control information 1601 is configured as a first relay control channel 1611 along with CRC sequence after being coded, and the uplink relay control information 1603 is configured as a second control channel 1613.

Since it may exist or not, the uplink relay control information 1603 is transmitted in the separate semi-static resource but not transmitted long with the downlink control information 1601. In case that the channels are configured as described above, the downlink secondary relay control channel 1637 and the relay data channel 1639 are mapped to the dynamic resource region 1635. Since PBICH transmitted in the semi-static resource region is mapped to the first slot, the second slot of the corresponding region is empty so as to be filled with the relay data channel 1639.

[Fifth Embodiment]

The fifth embodiment proposes a method for using a part of the region transmitting PBICH in the fourth embodiment to transmit R-PHICH 1615. In the fourth embodiment, additional resource is not allocated for ROPHICH 1615 but the corresponding function is replaced by transmitting the uplink relay control information, although large amount of resource is wasted when no uplink relay control information is necessary. The PHICH is transmitted on the first two or three symbols of the first slot in the semi-static allocation resource and followed by the R-PHICH on two or one symbol.

[Sixth Embodiment]

Figure 17:
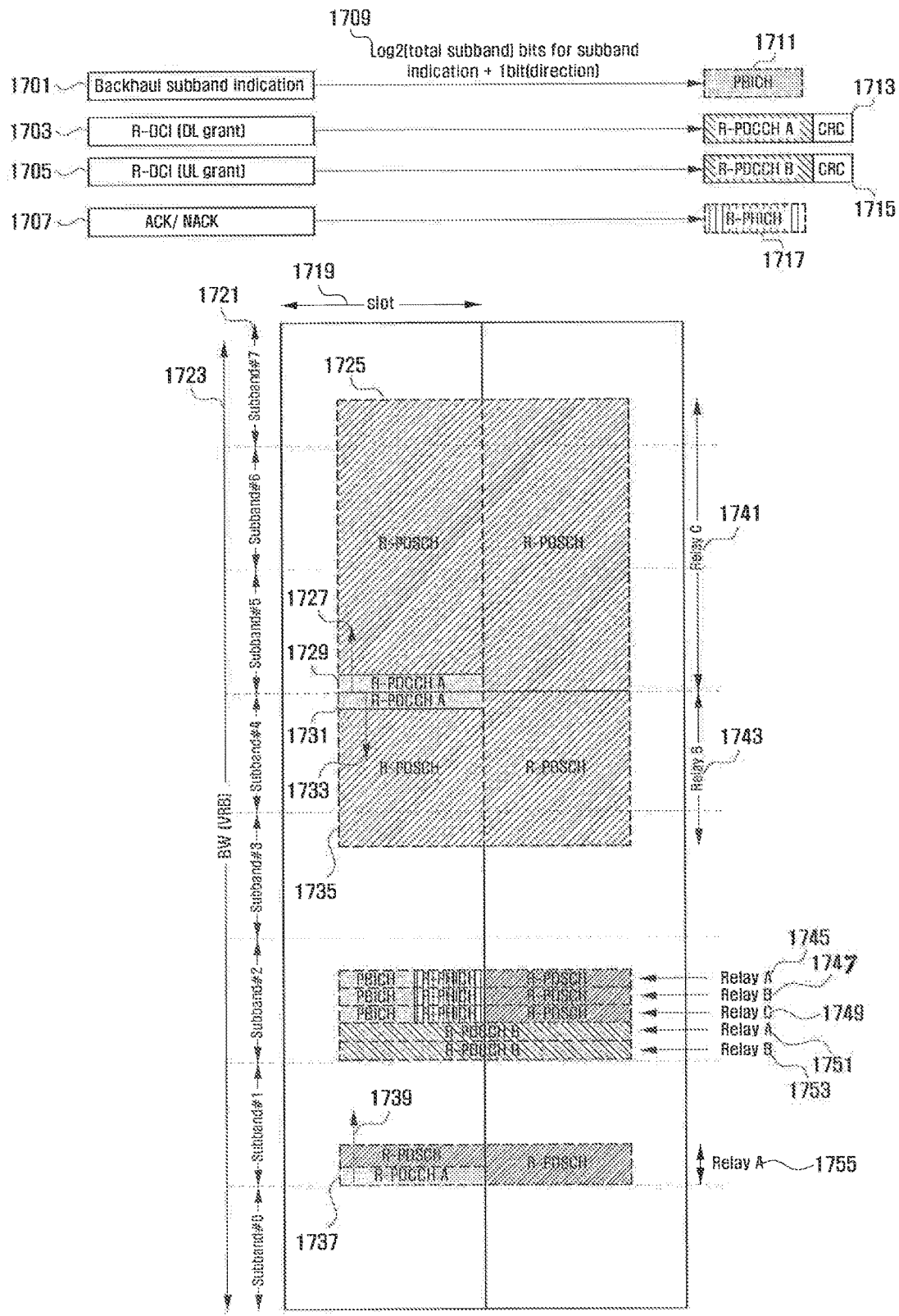
FIG. 17 is a diagram illustrating a configuration of a backhaul subframe according to the sixth embodiment of the present invention.

FIG. 17 is a diagram illustrating a configuration of a backhaul subframe according to the sixth embodiment of the present invention.

Referring to FIG. 17, the sixth embodiment proposes a method for transmitting PBICH information with reduced size in order to prevent the reduction of PHICH resource region from decreasing coding rate when the resource allocation structure of the fourth embodiment and the R-PHICH transmission method of the fifth embodiment are applied simultaneously.

In the previous embodiments, the information amount of PBICH or PR-PDCCH is log 2(# of RBs). In the legacy LTE system, up to 100 RBs can be allocated with 7 information bits. In case that the transmission resource region of the corresponding channel decreases, however, it is necessary to reduce the 7 information bits to maintain the reception performance on the corresponding channel.

Accordingly, the sixth embodiment proposes an information reduction method using sub-band allocation and allocation direction indicator. The entire resource is divided into N sub-bands for indicating dynamically allocated resources, and the allocation direction indicator indicates whether the resource allocation is performed in descending order of RB indices ("0") or ascending order of RB indices ("1").

In more detail, the sub-band identifiers the region for transmitting the backhaul channel of each relay. For example, if three relays exist in the system and if the entire bandwidth 1723 is divided into 8 sub-bands 1721, the relays receive the PBICH and R-PHICH in the resource regions allocated semi-statically as denoted by reference number 1745, 1747, and 1749. Also, the uplink relay control information is received in the resource region allocated to the corresponding relay semi-statically as denoted by reference number 1751 and 1753.

If the PBICH transmitted to the relay A has 3 sub-band allocation information and 1 bit allocation direction of 0010, the first three bits of sub-band allocation information indicates the allocation of sub-band 1 and the last one bit of the allocation direction indicates the allocation direction is the ascending order direction of RB indices. Accordingly, the R-PDCCH 1737 including the downlink control information is transmitted from the RB having the least RB index of sub-band and the data channel transmitted to the relay is carried in the remained dynamic resource region.

If the PBICH information transmitted to the relay B is 1001, the sub-band 4 is allocated with the allocation direction of descending order of RB indices as denoted by reference number 1733. Accordingly, the downlink control information is mapped to the part having the highest RB index in the corresponding sub-band. If the PBICH information transmitted to the relay C is 1010, the sub-band 5 is allocated with the allocation direction of ascending order of RB indices. The allocation resource of the sub-band can be allocated across plural sub-bands depending on the size of the dynamic resource as denoted by reference number 1725.

Since the relays connected to the eNB transmits large amount of transmission as compared to their number, if the information is transmitted as intended in the sixth embodiment, it is possible to minimize the scheduling performance degradation while reducing the information amount transmitted in the primary information. In order to prevent a specific sub-band from being allocated, the allocation direction indicator of 1 bit is provided such that it is possible to prevent the RB crossing two sub-bands from being excluded in scheduling. The number of sub-bands is notified to the relay through higher layer signaling, and the relays can be notified of the number of sub-bands in the same or different values.

Figure 18:
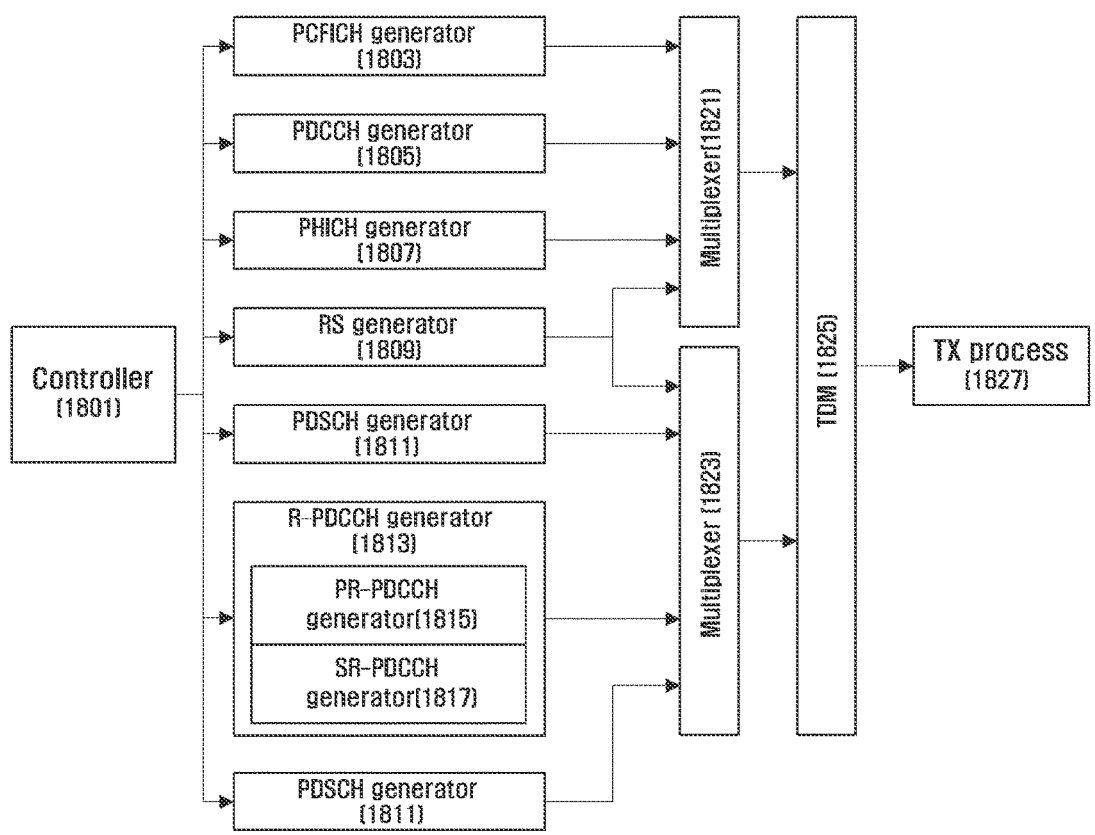
FIG. 18 is a block diagram illustrating a configuration of the eNB according to an embodiment of the present invention.

FIG. 18 is a block diagram illustrating a configuration of the eNB according to an embodiment of the present invention.

Referring to FIG. 18, the eNB includes a controller 1810 responsible for scheduling to transmit the current subframe. The PCFICH generator 1803 determines a number of control symbols in the current subframe to generate a sequence, and the PDCCH generator 1805 generates scheduling information of a UE for transmission in the current subframe and uplink transmission. The PHICH generator 1807 generates a response to the previous uplink transmission, the RS generator 1809 generates reference signals for corresponding cell, the PDSCH generator 1811 generates data to be transmitted to the respective UE according to the scheduling information generated by the PDCCH generator 1805, and the relay control channel generator 1813 generates a control channel for the relay to be transmitted in the backhaul subframe to the relay. The relay control channel is generates in stepwise manner by multiplexing the informations output from the primary relay control channel generator 1815 and the secondary relay control channel generator 1817. The relay data generator 1819 generates the data to be transmitted to the relay, the multiplexer 1821 multiplexes PCFICH, PDCCH, PHICH, and RS, and the multiplexer 1823 multiplexes the relay control channel and relay data channel into the resource. The data generated by the two multiplexer 1812 and 1823 are time division multiplexed by the TDM 1825 so as to be transmitted in the current subframe.

Figure 19:
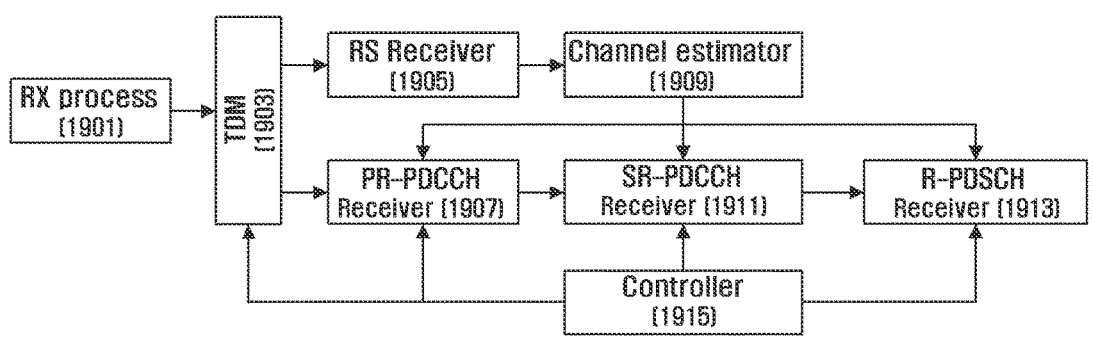
FIG. 19 is a block diagram illustrating a configuration of the relay according to an embodiment of the present invention.

FIG. 19 is a block diagram illustrating a configuration of the relay according to an embodiment of the present invention.

Referring to FIG. 19, the received signal is separated into control can data channels such that the RS receiver 1905 extracts the channel estimation information from the control channel and transfers the channel estimation information to the channel estimator 1909 and the primary relay control channel receiver 1907 extracts the primary relay control channel from the data channel. The secondary relay control channel receiver 1911 receives the secondary relay control channel, and the relay data channel receiver 1913 receives backhaul data using the dynamic resource allocation information including in the secondary relay control channel. The entire procedure is controlled by the reception controller 1915 of the relay.

Although the description has been made with reference to particular embodiments, the present invention can be implemented with various modification without departing from the scope of the present invention. Thus, the present invention is not limited to the particular embodiments disclosed but will include the following claims and their equivalents.

What is claimed is:

1. A backhaul subframe channel transmission method of a base station in a mobile communication system, the method comprising:
   transmitting a higher layer signaling for a first semi-static resource region for downlink relay control information including downlink grant and a second semi-static resource region for uplink relay control information including uplink grant to the relay;
   generating the downlink relay control information and the uplink relay control information;
   mapping the downlink relay control information to a first slot of the first semi-static resource region and the uplink relay control information to a second slot of the second semi-static resource region, allocated to the relay;
   mapping relay data to the second slot of the backhaul subframe; and
   transmitting the backhaul subframe including the downlink relay control information,
   wherein the first semi-static resource region for the downlink relay control information is different from the second semi-static resource region for the uplink relay control information.

2. A backhaul subframe channel reception method of a relay in a mobile communication system, the method comprising:
   receiving a higher layer signaling for a first semi-static resource region for downlink relay control information including downlink grant and a second semi-static resource region for uplink relay control information including uplink grant from a base station;
   receiving the downlink relay control information in a first slot of the first semi-static resource region allocated to the relay;
   receiving uplink relay control information in a second slot of the second semi-static resource region;
   checking relay data using the downlink relay control information; and
   receiving the relay data based on the downlink relay control information in the second slot,
   wherein the first semi-static resource region for the downlink relay control information is different from the second semi-static resource region for the uplink relay control information.

3. A base station for transmitting a backhaul subframe in a mobile communication system, the base station comprising:
   a transceiver configured to transmit and receive a signal; and
   a controller configured to control to:
     transmit a higher layer signaling for a first semi-static resource region for downlink relay control information including downlink grant and a semi-static resource region for uplink relay control information including uplink grant to the relay,
     generate the downlink relay control information and the uplink relay control information,
     map the downlink relay control information to a first slot of the first semi-static resource region and the uplink relay control information to a second slot of the second semi-static resource region, allocated to the relay,
     map relay data to the second slot of the backhaul subframe, and
     transmit the backhaul subframe including the downlink relay control information,
   wherein the first semi-static resource region for the downlink relay control information is different from the second semi-static resource region for the uplink relay control information.

4. A relay for receiving a backhaul subframe in a wireless communication system, the relay comprising:
   a transceiver configured to transmit and receive a signal; and
   a controller configured to:
     receive a higher layer signaling for a first semi-static resource region for downlink relay control information including downlink grant and a second semi-static resource region for uplink relay control information including uplink grant from a base station,
     receive the downlink relay control information in a first slot of the first semi-static resource region allocated to the relay,
     receive uplink relay control information in a second slot of the second semi-static resource region, and check relay data using the downlink relay control information, and receive the relay data based on the downlink relay control information in the second slot, wherein the first semi-static resource region for the downlink relay control information is different from the second semi-static resource region for the uplink relay control information.

\* \* \* \* \*